(12) United States Patent
Baskaran et al.

(10) Patent No.: US 10,713,022 B2
(45) Date of Patent: Jul. 14, 2020

(54) SYSTEMS AND METHODS FOR STENCIL AMPLIFICATION

(71) Applicant: Reservoir Labs, Inc., New York, NY (US)

(72) Inventors: Muthu M. Baskaran, Old Tappan, NJ (US); Thomas Henretty, Brooklyn, NY (US); Richard A. Lethin, New York, NY (US); Benoit J. Meister, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 80 days.

(21) Appl. No.: 14/927,053

(22) Filed: Oct. 29, 2015

(65) Prior Publication Data

US 2016/0147514 A1 May 26, 2016

Related U.S. Application Data

(60) Provisional application No. 62/072,183, filed on Oct. 29, 2014.

(51) Int. Cl.
*G06F 8/41* (2018.01)

(52) U.S. Cl.
CPC .......... *G06F 8/4441* (2013.01); *G06F 8/4434* (2013.01)

(58) Field of Classification Search
CPC ...... G06F 8/4441; G06F 8/4434; G06F 8/443; G06F 8/452
USPC .......................................................... 717/150
See application file for complete search history.

(56) References Cited

PUBLICATIONS

Kevin Alan Stock, "Vectorization and Register Reuse in High Performance Computing", Aug. 19, 2014, The Ohio State University, Graduate Program in Computer Science and Engineering, 172 pages.*
Youcef Barigou, "Acceleration of real-life stencil codes on GPUs", Oct. 27, 2011, HAL Id: dumas-00636254, 39 pages.*
Henretty et al., "A Stencil Compiler for Short-Vector SIMD Architectures", Jun. 10-14, 2013, 2013 ACM 978-1-4503-2130-3/13/06, 12 pages.*
Chipeperekwa, Caracal: unrolling memory bound stencils, University of California—San Diego, 2013 (Year: 2013).*
Henretty et al., A Stencil Compiler for Short-Vector SIMD Architectures; ICS'13, 2013 (Year: 2013).*
Li et al., Automatic Tiling of Iterative Stencil Loops, ACM Transactions on Programming Languages and Systems, vol. 26, No. 6, Nov. 2004 (Year: 2004).*

(Continued)

*Primary Examiner* — Bing Zhao
(74) *Attorney, Agent, or Firm* — Goodwin Procter LLP

(57) ABSTRACT

In a sequence of major computational steps or in an iterative computation, a stencil amplifier can increase the number of data elements accessed from one or more data structures in a single major step or iteration, thereby decreasing the total number of computations and/or communication operations in the overall sequence or the iterative computation. Stencil amplification, which can be optimized according to a specified parameter such as compile time, run time, code size, etc., can improve the performance of a computing system executing the sequence or the iterative computation in terms of run time, memory load, energy consumption, etc. The stencil amplifier typically determines boundaries, to avoid erroneously accessing data elements not present in the one or more data structures.

38 Claims, 18 Drawing Sheets

(56) References Cited

PUBLICATIONS

Holewinski et al., High-Performance Code Generation for Stencil Computations on GPU Architectures; ICS'12, 2012 (Year: 2012).*
Renganarayana et al., Towards Optimal Multi-level Tiling for Stencil Computations; IEEE, 2007 (Year: 2007).*
Strzodka et al., Cache Accurate Time Skewing in Iterative Stencil Computations; IEEE, 2011 (Year: 2011).*
Baskaran, et al., "Automatic generation of GPU-accelerated code for seismic stencil applications, " in Eighty-First Annual Meeting of Society of Exploration Geophysicists, SEG 2011, Sep. 2011.
Bondhugula, et al., "A practical automatic polyhedral parallelizer and locality optimizer," in ACM SIGPLAN Programming Languages Design and Implementation (PLDI '08), Tucson, Arizona, Jun. 2008.
Christen, et al., "Patus: a code generation and autotuning framework for parallel iterative stencil computations on modern microarchitectures," in Parallel & Distributed Processing Symposium (IPDPS), 2011 IEEE International, pp. 676-687. IEEE, 2011.
Datta, et al., "Optimization and performance modeling of stencil computations on modern microprocessors," SIAM Review, 51(1):129-159, 2009.
Dursun, et al., "A multilevel parallelization framework for high-order stencil computations," in Proceedings of the 15th International Euro-Par Conference on Parallel Processing, pp. 642-653. Springer-Verlag, 2009.
Grosser, et al., "Hybrid hexagonal/classical tiling for GPUs," in Proceedings of Annual IEEE/ACM International Symposium on Code Generation and Optimization, CGO '14, pp. 66:66-66:75, New York, NY, USA, 2014. ACM.
Henretty, et al., "A stencil compiler for short-vector SIMD architectures," in Proceedings of the 27th International ACM Conference on International Conference on Supercomputing, ICS '13, pp. 13-24, New York, NY, USA, 2013. ACM.
Henretty, et al., "Data layout transformation for stencil computations on short Simd architectures," in Proceedings of the International Conference on Compiler Construction (CC'11), Saarbrücken, Germany, Mar. 2011, Springer Verlag.
Holewinski, et al, "High performance code generation for stencil computations on GPU architectures," in Proceedings of the 26th ACM International Conference on Supercomputing, ICS '12, pp. 311-320, New York, NY, USA, 2012. ACM.
Kschischang et al. "Factor graphs and the sum-product algorithm," IEEE Transactions on Information Theory, 47(2):498-519, 2001.
Matteo Frigo and Volker Strumpen, "Cache oblivious stencil computations," in Proceedings of the 19th Annual International Conference on Supercomputing, ICS '05, pp. 361-366, New York, NY, USA, 2005. ACM.
Paulius Micikevicius, "3D finite difference computation on GPUs using CUDA," in Second Workshop on General-Purpose Computation on Graphics Processing Units, GPGGPU-2, Mar. 2009.
Ragan-Kelley, et al., "Halide: A language and compiler for optimizing parallelism, locality, and recomputation in image processing pipelines," in Proceedings of the 34th ACM SIGPLAN Conference on Programming Language Design and Implementation, PLDI '13, pp. 519-530, New York, NY, USA, 2013. ACM.
Stock, et al., "A framework for enhancing data reuse via associative reordering," in Proceedings of the 35th ACM SIGPLAN Conference on Programming Language Design and Implementation, pp. 65-76, ACM, 2014.
Tang, et al., "The Pochoir stencil compiler," in Proceedings of the 23rd ACM Symposium on Parallelism in Algorithms and Architectures, SPAA '11, pp. 117-128, 2011.
Vasilache, et al., "Joint scheduling and layout optimization to enable multi-level vectorization," in Second International Workshop on Polyhedral Compilation Techniques (IMPACT' 12), Paris, France, Jan. 2012.
Yann LeCun and Yoshua Bengio, "Convolutional networks for images, speech, and time series, "The handbook of brain theory and neural networks, 3361, 1995.

\* cited by examiner

```
for (t=0;t<T;t++) {
   for (i=1;i<N-1;i++) {
S0: B[i] = w0*A[i-1] + w1*A[i] + w2*A[i+1];
   }
   for (i=1;i<N-1;i++) {
S1: A[i] = B[i];
   }
}
```

Listing 1. Stencil code, three point 1D

```
for (t=0;t<T/2;t++) {
  // Start boundary
  B[1] = w0*A[0] +
         w1*(w0*A[0]+w1*A[1]+w2*A[2]) +
         w2*(w0*A[1]+w1*A[2]+w2*A[3]);
  // Steady state
  for (i=2;i<N-2;i++) {
    B[i] = w0*(w0*A[i-2]+w1*A[i-1]+w2*A[  i]) +
           w1*(w0*A[i-1]+w1*A[  i]+w2*A[i+1]) +
           w2*(w0*A[  i]+w1*A[i+1]+w2*A[i+2]);
  }
  // End boundary
  B[N-2] = w0*(w0*A[N-4]+w1*A[N-3]+w2*A[N-2]) +
           w1*(w0*A[N-3]+w1*A[N-2]+w2*A[N-1]) +
           w2*A[N-1];
  for (i=1;i<N-1;i++) {
    A[i] = B[i];
  }
}
```

Listing 2. Three point one-dimensional stencil code, amplification factor = 1

```
1   for (t=0;t<T/2;t++) {
2     // Start boundary
3     B[1] = (w0 + w0*w1)*A[0] +
4            (w0*w2 + w1*w1)*A[1] +
5            2*w1*w2*A[2] + w2*w2*A[3];
6     // Steady state
7     for (i=2;i<N-2;i++) {
8       B[i][j] = w0*w0*A[i-2]+2*w0*w1*A[i-1]+
9                 (2*w0*w2 + w1*w1)*A[i] +
10                2*w1*w2*A[i+1] + w2*w2*A[i+2]
11    }
12    // End boundary
13    B[N-2] = w0*w0*A[N-4] + 2*w0*w1*A[N-3]+
14             (w0*w2 + w1*w1)*A[N-2] +
15             (w1*w2 + w2)*A[N-1];
16    for (i=1;i<N-1;i++) {
17      A[i] = B[i];
18    }
19  }
```

Listing 3. Three point one-dimensional stencil code, amplification factor = 1 (simplified)

FIG. 5

```
1  // Hoisted coefficient calculations
2  double v0 = w0*w0;
3  double v1 = 2*w0*w1;
4  double v2 = 2*w0*w2 + w1*w1;
5  double v3 = 2*w1*w2;
6  double v4 = w2*w2;
7  double v5 = w0 + w0*w1;
8  double v6 = w0*w2 + w1*w1;
9  double v7 = w2 + w1*w2;
10
11 // Time loop
12 for (t=0;t<T/2;t++) {
13   // Start boundary
14   B[1] = v5*A[0] + v6*A[1] +
15          v3*A[2] + v4*A[3];
16   // Steady state
17   for (i=2;i<N-2;i++) {
18     B[i] = v0*A[i-2] + v1*A[i-1] +
19            v2*A[ i] + v3*A[i+1] +
20            v4*A[i+2]
21   }
22   // End boundary
23   B[N-2] = v0*A[N-4] + v1*A[N-3]+
24            v6*A[N-2] + v7*A[N-1];
25   // Buffer switch
26   for (i=1;i<N-1;i++) {
27     A[i] = B[i];
28   }
29 }
```

Listing 4. Three point one-dimensional stencil code, amplification factor = 1 (final)

FIG. 6

```
for (t=0;t<T/3;t++) {

// Start boundary
  B[1] = w0*A[0] +
         w1*(w0*A[0]+w1*A[1]+w2*A[2]) +
         w2*(w0*A[1]+w1*A[2]+w2*A[3]);

B[2] = w0*(w0*A[0] +
             w1*(w0*A[0]+w1*A[1]+w2*A[2]) +
             w2*(w0*A[1]+w1*A[2]+w2*A[3])) +
         w1*(w0*(w0*A[0]+w1*A[1]+w2*A[2]) +
             w1*(w0*A[1]+w1*A[2]+w2*A[3]) +
             w2*(w0*A[2]+w1*A[3]+w2*A[4])) +
         w2*(w0*(w0*A[1]+w1*A[2]+w2*A[3]) +
             w1*(w0*A[2]+w1*A[3]+w2*A[4]) +
             w2*(w0*A[3]+w1*A[4]+w2*A[5]));

// Steady state
  for (i=3;i<N-3;i++) {
    B[i] = w0*(w0*(w0*A[i-3] + w1*A[i-2] + w2*A[i-1]) +
               w1*(w0*A[i-2] + w1*A[i-1] + w2*A[i  ]) +
               w2*(w0*A[i-1] + w1*A[i  ] + w2*A[i+1])) +
           w1*(w0*(w0*A[i-2] + w1*A[i-1] + w2*A[i  ]) +
               w1*(w0*A[i-1] + w1*A[i  ] + w2*A[i+1]) +
               w2*(w0*A[i  ] + w1*A[i+1] + w2*A[i+2])) +
           w2*(w0*(w0*A[i-1] + w1*A[i  ] + w2*A[i+1]) +
               w1*(w0*A[i  ] + w1*A[i+1] + w2*A[i+2]) +
               w2*(w0*A[i+1] + w1*A[i+2] + w2*A[i+3]));
  }

// End boundary
  B[N-3] = w0*(w0*(w0*A[N-6]+w1*A[N-5]+w2*A[N-4]) +
               w1*(w0*A[N-5]+w1*A[N-4]+w2*A[N-3]) +
               w2*(w0*A[N-4]+w1*A[N-3]+w2*A[N-2])) +
           w1*(w0*(w0*A[N-5]+w1*A[N-4]+w2*A[N-3]) +
               w1*(w0*A[N-4]+w1*A[N-3]+w2*A[N-2]) +
               w2*(w0*A[N-3]+w1*A[N-2]+w2*A[N-1])) +
           w2*(w0*(w0*A[N-4]+w1*A[N-3]+w2*A[N-2]) +
               w1*(w0*A[N-3]+w1*A[N-2]+w2*A[N-1]) +
               w2*A[N-1]);

B[N-2] = w0*(w0*A[N-4]+w1*A[N-3]+w2*A[N-2]) +
           w1*(w0*A[N-3]+w1*A[N-2]+w2*A[N-1]) +
           w2*A[N-1];

for (i=1;i<N-1;i++) {
    A[i] = B[i];
  }
}
```

Listing 5

FIG. 8

```
for t = 1..T {
  for i = 1..M-2
    for j = 1..N-2
      tmp[i][j] =              c0*a[i-1][j] +
              c1*a[i][j-1]+c2*a[i ][j]+c3*a[i][j+1] +
                            c4*a[i+1][j];
  for i = 1..M-2
    for j = 1..N-2
      a[i][j] = tmp[i][j];
}
```

Listing 6

FIG. 11

```
for t = 1..T/3 {
  for i = 3..M-4
    for j = 3..N-4
      tmp[i][j] =              cc0*a[i-2][j] +
              cc1*a[i-1][j-1]+ cc2*a[i-1][j]+ cc3*a[i-1][j+1] +
cc4*a[i][j-2]+cc5*a[i ][j-1]+ cc6*a[i ][j]+ cc7*a[i ][j+1]+cc8*a[i][j+2]
              cc9*a[i+1][j-1]+cc10*a[i+1][j]+cc11*a[i+1][j+1] +
                            cc12*a[i+@][j];
  for i = 1..M-2
    for j = 1..N-2
      a[i][j] = tmp[i][j];
}
```

Listing 7

FIG. 12

```
1   // Top left boundary statements
2   S1(1,1);S2(1,2);
3   S3(2,1);S4(2,2);
4
5   // Top center boundary statements
6   S5(1,3)...S5(1,N-4)
7   S6(2,3)...S6(2,N-4)
8
9   // Top right boundary statements
10  S7(1,N-3);S8(1,N-2);
11  S9(2,N-3);S10(2,N-2);
12
13  // Left center boundary statements
14  S11(3,1)...S11(M-4,1)
15  S12(3,2)...S12(M-4,2)
16
17  // Right center boundary statements
18  S13(3,N-3)...S13(M-4,N-3)
19  S14(3,N-2)...S14(M-4,N-2)
20
21  // Bottom left boundary statements
22  S15(M-3,1);S16(M-3,2);
23  S17(M-2,1);S18(M-2,2);
24
25  // Bottom center boundary statements
26  S19(M-3,3)...S19(M-3,N-4)
27  S20(M-2,3)...S20(M-2,N-4)
28
29  // Bottom right boundary statements
30  S21(M-3,N-3);S22(M-3,N-2);
31  S23(M-2,N-3);S24(M-2,N-2);
32
33  // Steady state loops
34  for i = 3..M-4
35    for j = 3..N-4
36      S0(i,j);
```

Listing 8

FIG. 13

```
1   // Top left boundary statements
2   S1(1,1);S2(1,2);
3   S3(2,1);S4(2,2);
4
5   // Top center boundary loop
6   for j = 3..N-4
7     S5(1,j);
8     S6(2,j);
9
10  // Top right boundary statements
11  S7(1,N-3);S8(1,N-2);
12  S9(2,N-3);S10(2,N-2);
13
14  // Left center boundary loop
15  for i = 3..M-4
16    S11(i,1);
17    S12(i,2);
18
19  // Right center boundary loop
20  for i = 3, M-4
21    S13(i,N-3);
22    S14(i,N-2);
23
24  // Bottom left boundary statements
25  S15(M-3,1);S16(M-3,2);
26  S17(M-2,1);S18(M-2,2);
27
28  // Bottom center boundary loop
29  for j = 3, N-4
30    S19(M-3,j);
31    S20(M-2,j);
32
33  // Bottom right boundary statements
34  S21(M-3,N-3);S22(M-3,N-2);
35  S23(M-2,N-3);S24(M-2,N-2);
36
37  // Steady state loops
38  for i = 3..M-4
39    for j = 3..N-4
40      S0(i,j);
```

Listing 9

FIG. 14

```
// Top left boundary statements
S1(1,1);S2(1,2);

// Top center boundary loop
for j = 3..N-4
  S5(1,j);

// Top right boundary statements
S7(1,N-3);S8(1,N-2);

// Top left boundary statements
S3(2,1);S4(2,2);

// Top center boundary loop
for j = 3..N-4
  S6(2,j);

// Top right boundary statements
S9(2,N-3);S10(2,N-2);

// Steady state loops
for i = 3..M-4
  S11(i,1); // Fused
  S12(i,2); // Fused
    for j = 3..N-4
      S0(i,j);
  S13(i,N-3); // Fused
  S14(i,N-2); // Fused // Bottom left boundary statements
S15(M-3,1);S16(M-3,2);

// Bottom center boundary loop
for j = 3, N-4
  S19(M-3,j);

// Bottom right boundary statements
S21(M-3,N-3);S22(M-3,N-2);

// Bottom left boundary statements
S17(M-2,1);S18(M-2,2);

// Bottom center boundary loop
for j = 3, N-4
  S19(M-2,j);

// Bottom right boundary statements
S23(M-2,N-3);S24(M-2,N-2);
```

Listing 10

FIG. 16

```
Algorithm 1 amplify()
```
Require: $S$: Original stencil
Require: $A$: Array to read stencil from
Require: $G$: Amplification factor
Ensure: $S'$: Amplified stencil
 1: $S' \leftarrow \varnothing$
 2: $S_{ss} \leftarrow$ amplifySteadyState($S$, 0, $A$, $G$)
 3: $B \leftarrow$ amplifyBoundary($S$, $A$, $D$, $S_{ss}$, $G$)
 4: $S' \leftarrow S_{ss} \cup B$
 5: return $S'$

FIG. 17

```
Algorithm 2 amplifySteadyState()
```
Require: $S$: Stencil points
Require: $o$: Offset of this substencil's center point from initial stencil center point
Require: $A$: Array to read stencil from
Require: $G$: Amplification factor
Ensure: $S_{ss}$: Amplified steady state stencil
 1: $S_{ss} \leftarrow \varnothing$
 2: for point $s \in S$ do
 3:     $w_s \leftarrow$ weightAt($s$, $S$)
 4:     $o_s \leftarrow$ offsetFromInitialCenter($o$, $s$)
 5:     if $G == 0$ then
 6:         $t \leftarrow w_s * A[i + o_s]$
 7:     else
 8:         $t \leftarrow w_s *$ amplifySteadyState($S$, $o_s$, $A$, $G - 1$)
 9:     end if
10:     $S_{ss} \leftarrow S_{ss} \cup t$
11: end for
12: return $S_{ss}$

FIG. 18

```
Algorithm 3 amplifyBoundary()
```
Require: $S$: Original stencil
Require: $A$: Array to read stencil from
Require: $D$: Original stencil domain
Require: $S_{ss}$: Amplified steady state stencil
Require: $G$: Amplification factor
Ensure: $B$: The set of all non-steady state stencils
 1: $B \leftarrow \varnothing$
 2: $N \leftarrow \varnothing$
 3: for point $d \in D$ do
 4:   for point $s \in S_{ss}$ do
 5:     $i \leftarrow$ absoluteIndex($d, s$)
 6:     if $i \notin A$ then
 7:       $N \leftarrow N \cup i$
 8:       break
 9:     end if
10:   end for
11: end for
12: for $i \in N$ do
13:   $B \leftarrow B \cup$ amplifyPoint($S, i, A, D, G$)
14: end for
15: return $B$

FIG. 19

```
Algorithm 4 amplifyPoint()
```
Require: $S$: Original stencil
Require: $i$: Index of the point to be amplified
Require: $A$: Array to read stencil from
Require: $D$: Original stencil domain
Require: $G$: Amplification factor
Ensure: $S_b$: Stencil $S$ amplified at non-steady state point $i$
 1: $S_b \leftarrow \varnothing$
 2: for point $s \in S$ do
 3:     $w_s \leftarrow$ weightAt($s, S$)
 4:     $i_s \leftarrow$ absoluteIndex($i, s$)
 5:     if $G == 0$ or $i_s \notin D$ then
 6:         $t \leftarrow w_s * A[i_s]$
 7:     else
 8:         $t \leftarrow w_s *$amplifyAtPoint($S, i_s, A, D, G - 1$)
 9:     end if
10:     $S_b \leftarrow S_b \cup t$
11: end for
12: return $S_b$

FIG. 20

```
For (i=1; i<N; i++)
  S1();

For (i=1; i<N; i++)
  S2();

For (i=1; i<N; i++)
  S3();

...
...

For (i=1; i<N; i++)
  Sk();
```

FIG. 21A

```
For (p=1; p<P; p++) {
  For (i=1; i<L; i++) {
    For (j=1; j<M; j++) {
      For (k=1; k<N; k++) {
        S0: f0 (A_0, A_1, A_2);

S1: f1 (B_0, A_2);

S2: f2 (C_0; C_1, C_2; C_3);
      }
    }
  }

For (j=U; j>1; j--) {
    S3: f3 (D_0, W_0);
  }
}

For (t=1; t<T; t++) {
  For (j=1; j<M; j++) {
    For (k=1; k<N; k++) {
      S4: f4 (E_0);
    }
  }
}
```

FIG. 21B

```
// Weights from another array w[]
for (t=0; t<T; t++) {
  for (i=1; i<N-1; i++)
    A[i] = w[0]*B[i-1] + w[1]*B[i] + w[2]*B[i+1]
  for (i=1; i<N-1; i++)
    B[i] = A[i]
}
```

FIG. 22A

```
// Array values from another array orig[] (Ex. 1)
for (t=0; t<T; t++) {
  for (i=1; i<N-1; i++)
    A[i] = orig[i]*(w0*B[i-1] + w1*B[i] + w2*B[i+1]
  for (i=1; i<N-1; i++)
    B[i] = A[i]
}
```

FIG. 22B

```
// Array values from another array orig[] (Ex. 2)
for (t=0; t<T; t++) {
  for (i=1; i<N-1; i++)
    A[i] = w0*B[i-1]*orig[i-1] + w1*B[i]*orig[i] + w2*B[i+1]*orig[i+1]
  for (i=1; i<N-1; i++)
    B[i] = A[i]
}
```

FIG. 22C

SYSTEMS AND METHODS FOR STENCIL AMPLIFICATION

CROSS-REFERENCE TO RELATED APPLICATIONS

This application claims priority to and benefit of U.S. Provisional Patent Application No. 62/072,183, entitled "Systems and Method for Stencil Amplification," filed on Oct. 29, 2014, the entire contents of which are incorporated herein by reference.

GOVERNMENT LICENSE RIGHTS

This invention was made with Government support under contract number HR0011-12-C-0123 awarded by the Defense Advanced Research Projects Agency (DARPA). The Government has certain rights in the invention.

FIELD OF THE INVENTION

This disclosure generally relates to compilers and, in particular, to compilers that can optimize both performance and memory usage by manipulating stencil computations.

BACKGROUND

Stencil computations in general are a class of problems characterized by near-neighbor calculations on data structures (also referred to as arrays), that are iterated over several major steps. For example, a sequential iterator (such as a time-domain loop) or a sequence may include one or more statements. In each loop iteration or in each step in the sequence, for each statement, one or more elements of a data structure are accessed, and the respective values of these elements are used to compute a partial or a final result. The result may be stored in the same or a different data structure or array. The values of one or more elements that are used in a current iteration/sequence step are typically computed in a previous iteration/sequence step.

Moreover, the data structure elements that are accessed in an iteration/sequence step may be neighbors, forming a contiguous block of the data structure. The elements can also be near neighbors, where the access is strided. To illustrate, in a data structure $Z[100][1000]$, the elements $Z[25][10] \ldots Z[25][14]$ are neighbors and the elements $Z[60][0]$; $Z[60][1]$; $Z[60][3]$; $Z[60][6]$; and $Z[60][10]$ can be considered near neighbors, with a stride that monotonically increases by one. Another example of near neighbors includes the elements $Z[10][2]$; $Z[15][2]$; $Z[20][2]$; $Z[25][2]$; and $Z[30][2]$. Stencils are often used in a variety of applications including linear system solvers, finite-difference time domain simulations, convolutional neural networks, factor graphs (and closely related generalized distributive law problems), reverse time migration seismic data imaging techniques, and various image-processing techniques including blurring, denoising, segmentation, and image registration.

Stencils have been studied extensively in recent academic literature. General polyhedral compilation methods have been shown to be effective for stencils optimization. Some optimizations for stencils focus on both parallelism and loop blocking techniques. Loop blocking techniques can increase data locality by performing multiple iterations of the stencil on a small tile of the arrays sized to fit in a in high speed cache memory (e.g., on a CPU), and/or in a scratchpad memory (e.g., on GPU). Some techniques employ data layout and vectorization optimizations for increased performance.

An order of a stencil can be the number of points that extend beyond the write point in a given dimension and direction. For example, in a stencil $a[i][j]=b[i+1][j]+b[i-2][j]+b[i][j+3]+b[i][j-4]$, the order is 1 in the positive direction of dimension i, 2 in the negative direction of dimension i, 3 in the positive direction of dimension j, and 4 in the negative direction of dimension j. In some cases, a first order stencil may use values in a data structure that were computed in one previous iteration or during the computation of one previous step in a sequence of steps. A second-order stencil may use values that were computed in two previous iterations or sequence steps, etc. In general, the higher the stencil order the more the number of data elements accessed during computation of that stencil. The shape of a stencil in general may be described by the set of numbers of elements accessed in each dimension of a data structure.

Some techniques appear to describe taking advantage of associative and commutative properties of stencil and convolution algorithms for common subexpression elimination, reduction of register pressure and reduction of communication overhead, and some publications appear to describe optimization of higher-order stencils. Recently published techniques show that the computation of high-order stencils (e.g., second, third, and higher-order stencils) can be accelerated using certain compile-time transformations that may decrease register pressure and communication volume.

The difficulty of hand coding high-performance stencil codes has driven the development of a number of domain-specific languages that allow programmer specification of a stencil computation with automatic generation of optimized code. While such programming languages facilitate the specification of stencils and stencil-based computations, many commonly used stencils are not high-order stencils. In general, it is difficult, if not infeasible, to generate a high-order stencil of an optimized size and/or shape that is necessary to achieve maximum or substantial benefit from various known optimizations that can be applied to high-order stencils.

SUMMARY

In various embodiments, we describe a transformation called stencil amplification that can increase the stencil order or size, i.e., the number of data-structure elements or neighbors used to compute a stencil, and/or change stencil shape, without requiring derivation of a high-order formulation of the underlying problem or otherwise altering the semantics of the computation as a whole. To this end, in various embodiments, a stencil is composed by representing each stencil point with the function or data used to produce that point. For one or more stencil points, the corresponding function or the data used can be based on a number of values computed for the stencil in one or more previous computations. This typically results in increasing the order of the stencil or stencil amplification. The shape of a stencil may change during amplification thereof. A system used to produce the amplified stencil may be referred to as a stencil amplifier.

Accordingly, in one aspect a method is provided for improving processing efficiency of a computing system. The method generally applies to a computation sequence having a number of sequence steps. The sequence steps may be specified explicitly, as one step followed by another, or as iterations of a sequential loop. Each step may include one or more statements, each one accessing one or more data structures. One or more data structures may have one or more elements that take on sequence-step-dependent values. A statement can be a spatial loop or a nest of spatial loops. A step may include two or more loop statements, each having the same or different loop bounds. The method includes identifying by a processor within the computation sequence a computation using a stencil having a set of stencil points, where each stencil point corresponds to a value of a respective element of a data structure in a current sequence step.

The method also includes modifying the computation (also referred to as stencil computation or stencil), by replacing a stencil point with a first-level substencil that includes a set of first-level substencil points. If the set of first-level substencil points includes two or more first-level substencil points, the replacement can result in amplification of the stencil. In general, each first-level substencil point corresponds to a value of a respective element of the data structure from a first previous sequence step, i.e., a value that could have been computed in a previous sequence step if the sequence were executed without the modification described herein. Thus, in some embodiments, if the $t^{th}$ sequence step/iteration is the current sequence step/iteration, the First-level substencils may correspond to the one or more substencils obtained from the $(t-1)^{th}$ sequence step/iteration. Typically, one or more first-level substencil points are associated with data-structure element(s) that are different from data-structure elements associated with all stencil points. Thus, computation of the modified stencil may require accessing at least one element of the data structure that would not be accessed in the computation of the unmodified stencil.

In some embodiments, modifying the computation includes generating by the processor a loop or a loop nest corresponding to at least one stencil point (and the stencil itself, in some cases). The loop nest may include a loop corresponding to one or more parameterized dimensions of the data structure, and the loop may include a statement accessing an element of the data structure in the parameterized dimension according to a parameter based at least in part on the loop index. In some embodiments, modifying the computation includes generating by the processor a statement corresponding to at least one stencil point (and the stencil itself, in some cases), at which all dimensions of the data structure are parameterized. In some embodiments, however, the loop or the loop nest corresponds to at least one absolute dimension of the data structure. In some embodiments, modifying the computation includes generating by the processor a statement corresponding to at least one stencil point (and the stencil itself, in some cases), at which all dimensions of the data structure are absolute.

In some embodiments, either identifying or modifying the computation includes representing by the processor the computation as a function of values of respective elements of the data structure corresponding to the set of stencil points. Each element of the data structure may be specified using a central vector associated with the stencil and an offset vector associated with a corresponding stencil point. A cardinality of the central vector and a cardinality of the offset vector are generally equal to a number of spatial dimensions of the data structure. Each spatial dimension of the data structure may correspond to a respective element of the central vector and a respective element of the offset vector. Thus, each element of the central vector together with a corresponding element of the offset vector can identify a location in the corresponding spatial dimension of the data structure or can be viewed as an index into that spatial dimension.

Modifying the computation may include, for each first-level substencil point of the first-level substencil, computing by the processor a first-level resulting offset vector as a combination of the offset vector associated with the stencil point (i.e., the stencil point to be replaced with the first-level substencil) and an offset vector corresponding to that first-level substencil point. In addition, the method may include representing by the processor the stencil point as a function of values of respective elements of the data structure corresponding to the set of first-level substencil points, where each element of the data structure is specified using a central vector associated with the stencil and a first-level resulting offset vector associated with a corresponding first-level substencil point.

In some embodiments, the method includes, for each spatial dimension associated with the resulting offset vectors corresponding to the first-level substencil, determining by the processor a first-level maximum offset value. For the positive and negative offsets, corresponding to positive and negative directions relative to the central point, two maximum value may be computed. For a negative direction, i.e., when the offsets have negative values, the maximum value can be the numerically minimum offset value, representing a maximum magnitude of the offset in the negative direction.

The method may further include, for each spatial dimension associated with the resulting offset vectors corresponding to the first-level substencil, designating by the processor as a boundary element any data-structure element that is within a distance less than the first-level maximum offset value from a boundary of the data structure in that spatial dimension. In addition, the method may include designating by the processor a stencil point from the set of stencil points as a boundary point if that stencil point corresponds to a boundary element, and selecting a stencil point from the stencil, for replacement thereof with the first-level substencil, only if that stencil point is not designated as a boundary point.

In some embodiments, the method further includes remodifying by the processor the computation that was modified as described above, by replacing a first-level substencil point with a second-level substencil including a set of second-level substencil points. Each second-level substencil point may correspond to a value of a respective element of the data structure from a second previous sequence step. At least one second-level substencil point may be associated with a data-structure element that is different from data-structure elements associated with all stencil points and all first-level substencil points. The remodification thus represents an amplification factor greater than 1. One or more second-level substencils may correspond to the one or more substencils obtained from the $(t-2)^{th}$ sequence step/iteration, if the $t^{th}$ sequence step/iteration is the current sequence step/iteration. Each second-level substencil can replace one or more points in one or more first-level substencils.

In some embodiments, modifying the computation further includes, for each second-level substencil point of the second-level substencil, computing by the processor a second-level resulting offset vector. The resulting offset vector is computed as a combination of the first-level resulting offset vector, that is associated with a first-level substencil point to be replaced with the second-level substencil, and an offset vector corresponding to that second-level substencil point. In these embodiments, the method additionally includes representing the first-level substencil point as a function of values of respective elements of the data structure corresponding to the set of second-level substencil points. To this end, each element of the data structure is specified using a central vector associated with the stencil and a second-level resulting offset vector associated with a corresponding second-level substencil point.

The method may further include, for each spatial dimension associated with the resulting offset vectors corresponding to the second-level substencil, determining by the processor a second-level maximum offset value. Here again, for the positive and negative offsets, corresponding to positive and negative directions relative to the central point, two maximum value may be computed. For a negative direction, i.e., when the offsets have negative values, the maximum value can be the numerically minimum offset value, representing a maximum magnitude of the offset in the negative direction.

The method may also include, for each spatial dimension associated with the resulting offset vectors corresponding to the second-level substencil, designating by the processor as a boundary element any data-structure element that is within a distance less than the second-level maximum offset value from a boundary of the data structure in that spatial dimension. In addition, the method may include designating by the processor a stencil point from the set of stencil points as a boundary point if that stencil point corresponds to a boundary element, and selecting a stencil point from the stencil, for replacement thereof with the second-level substencil, only if that stencil point is not designated as a boundary point. Thus, boundary condition for the amplification factor 2 can be determined. Boundary conditions for other amplification factors can be determined in a similar manner. A cardinality of the set of first-level substencil points, a cardinality of the set of second-level substencil points, or both cardinalities may be greater than one, resulting in stencil amplification.

In some embodiments, each stencil point in a subset of stencil points from the set of stencil points is associated with a respective stencil coefficient. If the subset if stencil points is smaller than the set of stencil points, one or more stencil points that are not included in the subset are not explicitly associated with a weighting factor, i.e., the associated weighting factor is one. Each first-level substencil point in a subset of first-level substencil points from the set of first-level stencil points may also be associated with a respective first-level substencil coefficient. Modifying the computation may include generating a coefficient computation that produces a resulting coefficient, based on a stencil coefficient and a first-level substencil coefficient.

In some embodiments, the computation includes a first stencil point and a second stencil point. Modifying the computation may include replacing by the processor the first stencil point, having associated therewith a first stencil coefficient, with a first first-level substencil that includes a first first-level substencil point. The first first-level substencil point may be associated with a first substencil coefficient and may correspond to a particular element of the data structure. Modifying the computation may further include replacing the second stencil point, having associated therewith a second stencil coefficient, with a second first-level substencil that includes a second first-level substencil point. The second first-level substencil point may be associated with a second substencil coefficient and may correspond to the same particular element of the data structure. Generating the coefficient computation may include specifying a transform operation that produces the resulting coefficient, where the transform operation includes the first and second stencil coefficients and the first and second substencil coefficients. The method may include computing a value of the resulting coefficient at compile time.

In some embodiments, the computation sequence is specified using a sequential iterator and each sequence step corresponds to a respective iteration of the sequential iterator. A time-domain loop is an example of a sequential iterator. The method may further include hoisting the coefficient computation from the sequential iterations, thereby decreasing a number of computations within an iteration corresponding to the sequential iterator. Alternatively or in addition, the method may include decreasing a number of iterations of the sequential iterator according to an amplification factor.

In some embodiments, each stencil point in a subset of stencil points from the set of stencil points is associated with a respective stencil coefficient. The respective stencil coefficient may include a value corresponding to an element of the data structure corresponding to a respective first-level substencil point from the set of first-level substencil points. Thus, one or more coefficients in a current computation step/iteration may be based on the respective value(s) of one or more data-structure elements from one or more previous computation steps/iterations.

The structure used in stencil computation may include a number of arrays. In some embodiments, the data structure includes a first array that includes at least one sequence-step-dependent value, and a second array. Each stencil point in the set of stencil points may correspond to a value of a respective element of the first array in a current sequence step and a value of a respective element of the second array. Each first-level substencil point in the set of first-level substencil points may correspond to a value of a respective element of the first array from a previous sequence step. In some embodiments, the second array also includes one or more sequence-step-dependent values, and each first-level substencil point in the set of first-level substencil points may further correspond to a value of a respective element of the second array from a previous sequence step.

In another aspect, a system is provided for amplifying a stencil. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to identify, in a computation sequence including a number of sequence steps, a computation using a stencil having a set of stencil points. Each stencil point may correspond to a value of a respective element of a data structure in a current sequence step. in addition, the instructions program the processing unit to modify the computation by replacing a stencil point with a first-level substencil including a set of first-level substencil points. Each first-level substencil point may correspond to a value of a respective element of the data structure from a first previous sequence step. At least one first-level substencil point may be associated with a data-structure element that is different from data-structure elements associated with all stencil points. The data structure may have one or more elements that take on sequence-step-dependent values. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to amplify a stencil. The instructions may program the processing unit to identify, in a computation sequence including a number of sequence steps, a computation using a stencil having a set of stencil points. Each stencil point may correspond to a value of a respective element of a data structure in a current sequence step. in addition, the instructions program the processing unit to modify the computation by replacing a stencil point with a first-level substencil including a set of first-level substencil points. Each first-level substencil point may correspond to a value of a respective element of the data structure from a first previous sequence step. At least one first-level substencil point may be associated with a data-structure element that is different from data-structure elements associated with all stencil points. The data structure may have one or more elements that take on sequence-step-dependent values. In various embodiments, the instructions can program the processing unit to perform one or more of the method steps described above.

In the common case of spatial loops surrounded by a sequential loop (e.g., an outer iterative time-domain loop), the transformation can reduce the number of outer loop iterations required to compute the stencil. In the case of a sequence of stencil computations, e.g., consecutive dependent convolutions and pooling of stencils, stencil amplification can reduce the total number of steps in a sequence, e.g., the number of convolutions. The transformation may increase or decrease the number of computations in a single stencil, depending on the shape of the stencil. In some cases, memory accesses are replaced with arithmetic and/or logical operations. Amplifying a stencil may increase the temporal locality of stencil operands and may lead to significant register reuse and reduction in memory hierarchy traffic. The outcome of applying these techniques is referred to as an amplified stencil that is computed using more points, i.e., elements of the data structure accessed by a stencil, than the original.

BRIEF DESCRIPTION OF THE DRAWINGS

Various embodiments of the present invention taught herein are illustrated by way of example, and not by way of limitation, in the figures of the accompanying drawings, in which:

FIG. 5 depicts a listing of a code example having an amplified stencil that is optimized, according to one embodiment;

FIG. 6 depicts a listing of a code example having an amplified stencil that is optimized further, according to another embodiment;

FIG. 8 depicts a listing of a code example having a stencil shown in FIG. 2 amplified by an amplification factor of two, and generated using a stencil amplifier according to one embodiment;

FIG. 11 depicts a listing of another code example having an unamplified stencil computation;

FIG. 12 depicts a listing of a code example having a portion of an amplified stencil, generated using a stencil amplifier according to one embodiment;

FIG. 13 depicts a listing of a code example having boundary statements associated with an amplified stencil, according to one embodiment;

FIG. 14 depicts a listing of a code example having boundary statements associated with an amplified stencil that are optimized, according to one embodiment;

FIG. 16 depicts a listing of a code example having boundary statements associated with an amplified stencil that are optimized, according to another embodiment;

FIGS. 17-20 show various algorithms used in some embodiments of a stencil amplifier;

FIGS. 21A and 21B depict code fragments having unoptimized stencils that can be amplified using various embodiments of a stencil amplifier; and FIGS. 22A-22C depict other code fragments having unoptimized stencils that can be amplified using various embodiments of a stencil amplifier.

DETAILED DESCRIPTION

Figures 1, 2:
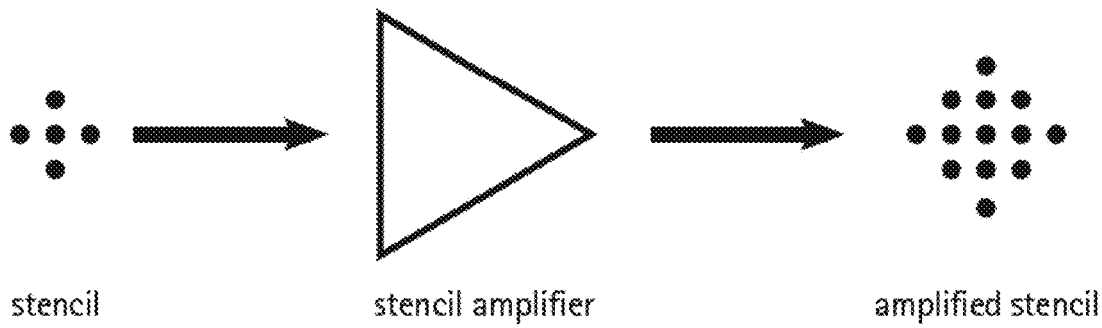
FIG. 1 schematically depicts an example of stencil amplification performed using a stencil amplifier according to various embodiments.
FIG. 2 depicts a listing of a code example having an unamplified stencil computation.

Increasing the order of a stencil typically may increase the stencil size, i.e., the number of data-structure elements accessed during the computation of the stencil. In general, the same number of elements need not be accessed in each dimension of the structure and, when the stencil is amplified, the numbers of additional elements accessed in different dimensions can be different. Therefore, by changing the order or size of a stencil, its shape can change. To illustrate, as shown in FIG. 1, an original five point two-dimensional stencil is amplified into a thirteen point stencil. The computation of the original stencil requires accessing up to five elements of one or more data structures in a single major step in a sequence of steps or in a single iteration. In one major step/iteration, up to four computational operations may be performed. A major step may include one or more computation steps. For the overall computation, two or more major steps of the sequence or two or more iterations may be needed. The computation of the amplified stencil may require accessing up to thirteen elements of the data structures, and this computation, involving up to twelve computational operations, can be performed in one major step or iteration.

Certain optimizations, such as parallelization, tiling, etc., that cannot be performed (or are not significantly effective) when only a few (e.g., up to four in this example) computational operations are performed in one major step/iteration may be performed effectively when more (e.g., up to twelve, in this example) computational operations are performed in one major step/iteration. Various embodiments described herein facilitate stencil amplification to generate amplified stencils, so that various optimizations that cannot applied effectively to the original stencils may be applied to the corresponding amplified stencils. In the discussion below, we refer to different kinds of data structures that may be involved in different stencil computations as arrays, for the sake of simplicity. The arrays can be one dimensional or multidimensional. In various examples, one dimensional arrays are used for the sake of simplicity of discussion only.

We provide a simple example to illustrate stencil amplification as described in various embodiments. Listing 1 in FIG. 2 shows the source code for a three point one-dimensional stencil. The code in Listing 1 includes an outer iterative ('t') loop (a sequential iterator) surrounding spatial loop nests i. The first spatial loop nest computes N−2 elements of the array B using three elements of array A and weights w0-w2. This computation, in which three elements of the array A are accessed, is an example of a three-point stencil. The second loop nest copies elements of B to A. This code performs 5 flops (computational operations) per point per major step, and (5NT-10T) total flops. For each iteration of the t loop, this code requires every element of A and B to be read and written at least once along with weights w0-w2. We conservatively assume that all operands, including weights, require a load or store instruction. Thus, this code performs (9NT-18T) memory operations.

Viewing the three point stencil as a function, we observe that each point of the stencil can be composed with the stencil function at the previous major step. In other words, each point of the stencil at time t can be expanded into the three point stencil used to compute that point at time (t−1). The result of this composition is shown in Listing 2, in FIG. 3. The process of composing a stencil with the functions and data used to produce its points, as described in various embodiments, can result in stencil amplification. We refer to composing an entire stencil once, as amplifying by an amplification factor of one. It should be noted that the amplification factor of one is not a unity factor; the size of the original stencil can increase due to applying the amplification factor one. Subsequent compositions of the entire stencil can be used to increase the amplification by a factor of one per each additional composition. In subsequent compositions, the values computed in different previous sequence steps/iterations are typically used.

Figures 3, 4:
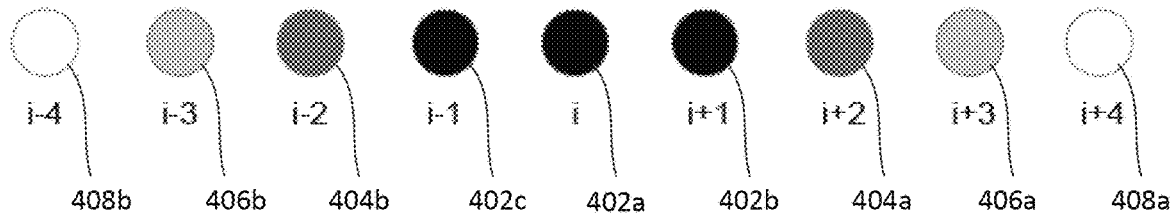
FIG. 3 depicts a listing of a code example having an amplified stencil, generated using a stencil amplifier according to one embodiment.
FIG. 4 schematically depicts stencil points used in different stencil compositions, according to some embodiments.

With reference to FIG. 4, the points or data-structure elements 402*a*, 402*b*, 402*c* of array A, computed at time (t−1) are used at time t, to compute B[i]. By performing one composition, and thereby amplifying the stencil by a factor of one, the points 404*a*, 404*b*, computed at time (t−2), are also used in the stencil computation at time t. By performing another composition, the points 406*a*, 406*b*, computed at time (t−3), are used in the stencil computation. By performing yet another composition, the points 408*a*, 408*b*, computed at time (t−4) can be used in the stencil computation at time t.

The code in Listing 2 (FIG. 3) produces results identical to those obtained by running the code in Listing 1; however, the number of loads and stores to main memory are reduced and the number of t loop iterations are reduced by one half. The code in Listing 2 can be further optimized by relaxing requirements that floating point computations are executed in the order dictated by the programmer and programming language, as shown in Listing 3 shown in FIG. 5. We used associative, commutative, and distributive algebraic simplification to obtain expressions for the weights of each point in the composed stencil. Finally, if a priori knowledge of the weights w0-w2 is available, we can further reduce the code shown in Listing 3 to the stencil shown in Listing 4 in FIG. 6, in which the computation of these weights is hoisted outside of the loop nest.

In the final version of the code, two four point stencils are executed T/2 times each at the boundaries of the computation, and a 5-point stencil is executed (N−4) times. A total of (9NT/2−11T+17) total floating-point computations are performed in the optimized version. Total communication operation count is (13NT/2−15T+30). Table 1 shows the values for the computation and communication counts, according to one implementation of Listing 4 shown in FIG. 6.

TABLE 1

Projected operation counts for naive and optimized versions of the three-point one-dimensional stencil (T = 2 and N = 1000)

|  | Flops | Communication Ops |
|---|---|---|
| Naïve | 9980 | 17964 |
| Optimized | 8995 | 13000 |
| Optimized/Naïve | 0.900 | 0.722 |

By amplifying by a factor of 1, we reduced the number of flops to 90.0% of the number of flops required for a naive implementation, i.e., one implementation of Listing 1 shown in FIG. 2. We also reduced the number of communication operations to 72.2% of the number of communication operations required for the naïve implementation.

We observe the following key points about the optimized code: (A) The result of stencil amplification is a higher order stencil capable of being optimized by other techniques such as parallelization, tiling, associative reordering, and hardware acceleration using, e.g., a graphics processing unit (GPU), a vectorized processor, a field programmable gate array (FPGA), etc. (B) If some or all of the values of stencil coefficients (e.g., w0, . . . , w2, in the foregoing example) are known at compile time, the values of derived coefficients (e.g., v0, . . . , v7, in the foregoing example) can be partially or fully precomputed, thus enabling a reduction in flops for each program run.

(C) On a standard (or unamplified) stencil, where one or more spatial loops are surrounded by a sequential loop, the amplification factor can be set up to T, with the output of one composition becoming the input of the next. This, in general, has four major consequences: (1) the size of the stencil can increase with the amplification factor; (2) the number of specialized boundary computations (described below) may increase with the amplification factor; (3) the count and polynomial degree of one or more coefficients may increase with the amplification factor; and (4) the number of outermost loop iterations may be divided by the amplification factor plus one.

Consequences (1) and (2) can increase executable code size. Consequence (3) can lead to large differences between the largest and smallest values in a stencil, typically due to multiplication of two or more coefficients and/or due to computation of exponents of one or more coefficients, and may force the amplifier to pay close attention to the numerical precision of calculations. Consequence (3), however, can also enable two powerful optimization described below. Consequence (4) can enable reductions in communication by performing fewer sweeps over the input array. A sweep generally includes accessing one or more elements of the array in one or more dimensions. Often, all elements in all array dimensions may be accessed in one sweep.

Additional key points include: (D) One or more coefficients derived during stencil amplification (e.g., v0, v2, v4, and v6 of Listing 4 (FIG. 6)), include weights raised to an integer power. As repeated compositions are performed, the finite set of weights used in the original program may be repeatedly multiplied by themselves. These high degree polynomials can be efficiently evaluated using optimized techniques for computing integer powers, such as exponentiation by squaring, that reduce total number of multiply operations in an amplified stencil from O(N) to O(log N).

(E) One or more coefficients derived during stencil amplification (e.g., coefficients v1, v2 and v3 of Listing 4 (FIG. 6)) include integer multiples of weight terms. In the foregoing example, one addition operation is replaced with one multiplication operation for each of these derived coefficients. While such a replacement may not always change the total number of floating-point operations (as in the foregoing example), in general, stencil amplification can replace one floating-point addition operation with a multiply operation, and subsequent addition operations may only require incrementing multiplication factor by one, thereby reducing the total number of floating-point addition operations.

Stencil Amplification

A procedure is presented for performing stencil amplification in the context of a typical stencil executed for a specified number of major steps/iterations. This procedure may generally apply to stencils of any number of dimensions (e.g., 1, 2, 5, etc.), with any number of stencil points in any dimension. For example, a stencil may have three points in dimension 1, two points in dimension 2, three points in dimension 3, 5 points in dimension 4, etc. These points (data-structure elements) may be contiguous or may be strided, where the stride can be a constant across all dimensions or may include different constants across different dimensions. The stride in one or more dimension may vary according to one or more specified functions. In general, the points are accessed from an array, one or more results are computed, and are stored in the same or a different array.

In some embodiments, this procedure assumes a single statement Jacobi stencil with constant weights and constant values at the problem boundaries. As a running example we consider the 3-point 1-dimensional Jacobi stencil shown in Listing 1 (FIG. 2). To apply this procedure to consecutive convolutions, it is generally enough to consider each convolution as a separate iteration with its own stencil functions and weights.

A Stencil as a Function

We consider a d-dimensional array A and identify an element in the array by an access vector $\vec{x}=(x_0, \ldots, x_{d-1})$. The value at the point referenced by $\vec{x}$ is denoted by $A[\vec{x}]$. The choice of a single array A is for ease of illustration only. Stencils across multiple arrays $A_0$, $A_1$, $A_2$, etc., can be used with a similar derivation. We describe a stencil to be a finite set of points P, with each point $p \in P$ determined by an offset vector $\vec{o}_p=(o_0, \ldots, o_{d-1})$ from a central point $\vec{c}$ and a weight $k_p \in \mathbb{R}$. The choice of a single, constant valued weight is for ease of illustration only. One or more constant, stencil valued, or time varying functions can be used to represent the weights of one or more stencil points.

Each point p corresponds to an element in A and the value of this element is denoted by $A[\vec{c}+\vec{o}_p]$. We compute the value at each point p in a stencil as a function.

$$f_p(A[\vec{c}+\vec{o}_p], k_p) = k_p A[\vec{c}+\vec{o}_p] \qquad (1)$$

In the example of Listing 1 (FIG. 2) we computed values for a 1-dimensional array A. Stencil points in A are centered at the point described by the 1-dimensional vector $\vec{c}=(i)$. The stencil P={((−1), w0), w1)), ((1), w2)} includes three offsets from t and their corresponding weights.

We describe a function $f_s$ to compute the value of stencil P at some point $\vec{x}$ in A as a sum-of-products where the product specified by $f_p$ is summed for each point $p \in P$.

$$f_s(A, \vec{x}, P) = \sum_{p \in P} f_p(A[\vec{x}+\vec{o}_p], k_p) \qquad (2)$$

$$= \sum_{p \in P} k_p A[\vec{x}+\vec{o}_p]$$

Sum-of-products computations are used herein for ease of illustration only. In general, any function over P and $A_0$, $A_1$, $A_2$, etc. can be used. Sum-of-products, and, more generally, operations that are commutative, associative, and distributive generally allow for various optimizations of an amplified stencil, so as to bring it into a form that is more amenable to further optimization using various known techniques such as parallelization, vectorization, tiling, etc.

In the running example, $f_s(A, i, P)=$w0*A[i−1]+w1*A[i+0]+w2*A[i+1] and corresponds to the right hand side of the body statement S0 in Listing 1 (FIG. 2). In one stencil iteration, $f_s$ is evaluated once for each point in a set $A_s$ such that $A_s \subset A$. The result of these evaluations are stored in array A' along with previous values of A at points where $f_s$ is not evaluated. Thus:

$$A'[\vec{x}] = f_s(A, \vec{x}, P) \quad \forall \vec{x} \in A_s \qquad (3)$$

$$= A[\vec{x}] \qquad \forall \vec{x} \notin A_s$$

In our running example and $A_s=\{A[i] | 1 \le i \le N-2\}$ and A'=A. Statement S1 explicitly copies values from a temporary array B to array A in order to form A'. In general, we denote the array A produced by major sequence step/iteration t as $A^{(t)}$. The values in $A^{(1)}$ are used to compute $A^{(2)}$, the values in $A^{(2)}$ are used to compute $A^{(3)}$, and so on, until all T major steps/iterations are analyzed. The final result of the Jacobi computation may be stored in $A^{(T)}$. In a sequence of computations (e.g., convolutions), $A^{(1)}$ may be the output of the first major computation step of the sequence, $A^{(2)}$ may be the output of the second major computation step of the sequence, and so on.

Steady State Values

We note that in various embodiments, the output values of one major step from a sequence of steps or an iteration are used as input to the next major step or iteration. In formal terms, we compose $f_p$ with $f_s$ to compute $f_{p'}$ as:

$$f_{p'} = f_p(f_s(A, \vec{x}+\vec{o}_{p'}, P), k_p) \qquad (4)$$

$$= k_{p'} \sum_{k \in P} k_p A[\vec{x}+\vec{o}_{p'}+\vec{o}_p]$$

We refer to $f_{p'}$ as a substencil. We replace the array value used to compute a stencil point with the stencil computation from the previous major step/iteration used to compute that array value.

Composing $f_s$ with $f_{p'}$ yields $f_{s'}$ as:

$$f_{s'}(A', \vec{x}, P) = \sum_{p' \in P} f_{p'}(f_s(A, \vec{x} + \vec{o}_{p'}, P), k_{p'}) \quad (5)$$

$$= \sum_{p' \in P} k_{p'} \left( \sum_{p \in P} k_p A[\vec{x} + \vec{o}_{p'} + \vec{o}_p] \right)$$

$$= \sum_{p' \in P} \sum_{p \in P} k_{p'} k_p A[\vec{x} + \vec{o}_{p'} + \vec{o}_p]$$

In the running example, we have $f_{s'}$ equal to the following expression:

w0*(w0*A[i−2]w1*(A[1−i]w2*A[i])+w1*(w0*A[i−1]+
w1*(A[i]w2*A[i+1])+w2*(w0*A[i]+w1*(A[i+1]+
w2*A[i+2])

Figure 7:
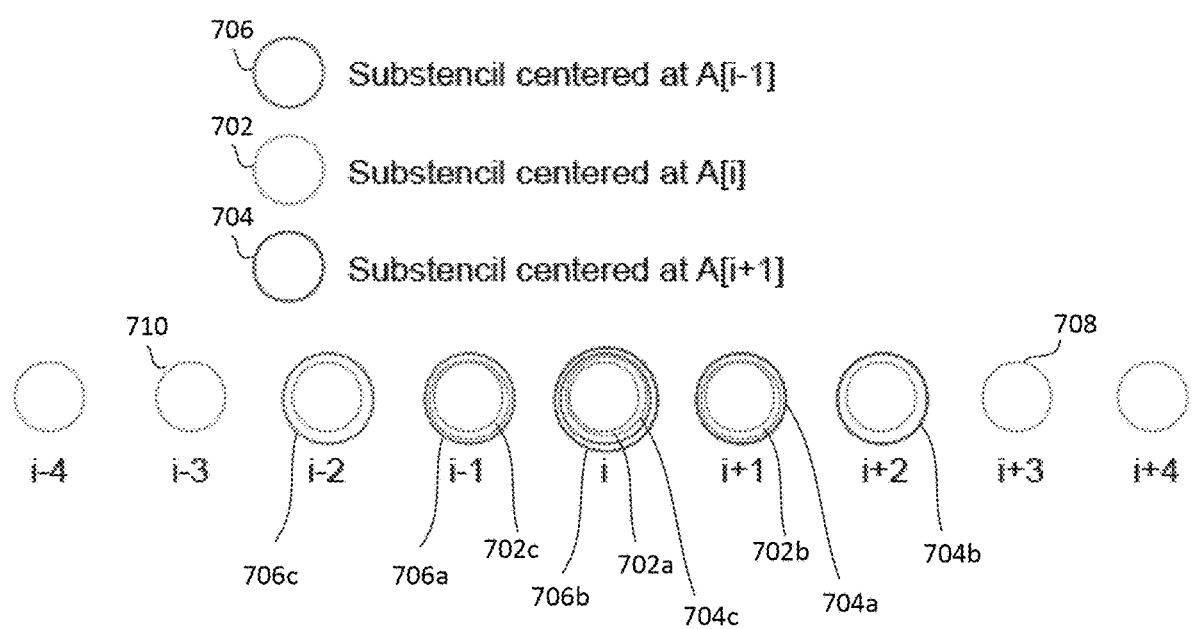
FIG. 7 schematically depicts substencils and the data-structure elements accessed by those stencils, according to one embodiment.

The points of A used by $f_{s'}$ for the running example are shown in FIG. 7. We replace each array reference in the stencil with the substencil used to compute it. In some embodiments, this substencil is multiplied by the weight of the array reference it replaces. Note that A[i], indicated at 702 is included in three substencils 702a, 702b, 702c; A[i+1] (indicated at 704) and A [i−1] (indicated at 706) each is included in two substencils 704a, 704b, 706a, 706b; and A[i+2] and A[i−2] are included in one substencil each, 708, 710. After multiplying each substencil by its weight we have |P|² terms for a stencil of size |P| in $f_{s'}$.

The following observation can be made about the resulting coefficient. In some embodiments, when the weight of an individual substencil point is multiplied by an identical weight of the substencil as a whole, this multiplication can be replaced by exponentiation. Subsequent multiplications result in the value of the exponent increasing by 1 instead of a multiply operation.

In some embodiments, we can significantly reduce the number of terms by taking advantage of com-mutative, associative and distributive laws of algebra to combine all terms with the same array reference. Formally, we may combine terms when the following condition holds:

$$\vec{o}_{p'_j} + \vec{o}_{p_m} = \vec{o}_{p'_k} + \vec{o}_{p_n} \quad (6)$$

for any points $p'_j$, $p'_k$ in the stencil and for any points $p_m$, $p_n$ in any substencil. In our running example, we combined terms with identical array references to obtain the following expression.

w0*w0*A[i−2]+2*w0*w1*A[i−1]+(2*w0*w2+w1*w1)
*A[i]+2*w1*w2*A[i+1]+w2*w2*A[i+2]

In general, after combining terms we are left with a stencil where each term is a product of an array reference A[$\vec{x}$+$\vec{o}_{p'}$+$\vec{o}_p$] and a coefficient $v_{p'}$ given by:

$$v_{p'} = \sum_{\substack{j,k,m,n \in P \\ \vec{o}_{p'_j} + \vec{o}_m = \vec{o}_{k'} + \vec{o}_n}} k_j k_m + k_{k'} k_n \quad (7)$$

Two observations can be made about $v_{p'}$: (A) Different $k_j k_m$ and/or $k_k k_n$ may be identical. In this case we can replace an addition of identical weights with a multiplication. (B) A resulting weight $v_{p'}$ may include only the original weights, integer coefficients of those weights, and weights taken to integer powers. In some embodiments, since the values of weights can be invariant for all iterations, initialization of all $v_{p'}$ can be hoisted outside the iterative loop and may be: (1) computed at compile time, if all weights are known, (2) partially computed at compile time and completed at run time if only some weights are known, or (3) computed at run time once, before the main iterative loop is executed, if no weights are known.

The end result of a single step stencil amplification is a new stencil we denote as $P^{(t)}$ where t is the amplification factor. The stencil $P^{(1)}$ can be repeatedly amplified using the original substencil used in the first amplification to yield $P^{(2)}, P^{(3)}, \ldots, P^{(T)}$, where T is the final amplification factor. An amplified stencil (e.g., $P^{(1)}$) can also be amplified by itself to yield $P^{(2)}, P^{(4)}, \ldots, P_{(T)}$. The second method, that can iteratively square a stencil, can enable an optimization to decrease code generation overhead. Finally, since amplification in some embodiments effectively combines several iterations of the outermost sequential iterator/time-domain loop into a single iteration, we can divide the total number of outer loop iterations (T) by the amplification factor (t). With reference to FIG. 8, Listing 5 shows a code produced by amplifying the steady state stencil with an amplification factor of two in the manner described above. In some embodiments, this code may be optimized further, as described above, as well, for example with reference to FIGS. 5 and 6.

Boundary Values

The steady state stencil, as described above, may reference points outside of array A when computed at points near the edges of $A_s^{(t)}$. This is because the stencil increases in size with each amplification causing elements further and further away from the central point to be referenced. Thus, to correctly perform amplification in various embodiments, we find the points $\vec{b} \in A_s^{(t)}$ that may reference points outside of A when computed, remove these points from $A_s^{(t)}$, and generate specialized stencils for these points.

Figure 9:
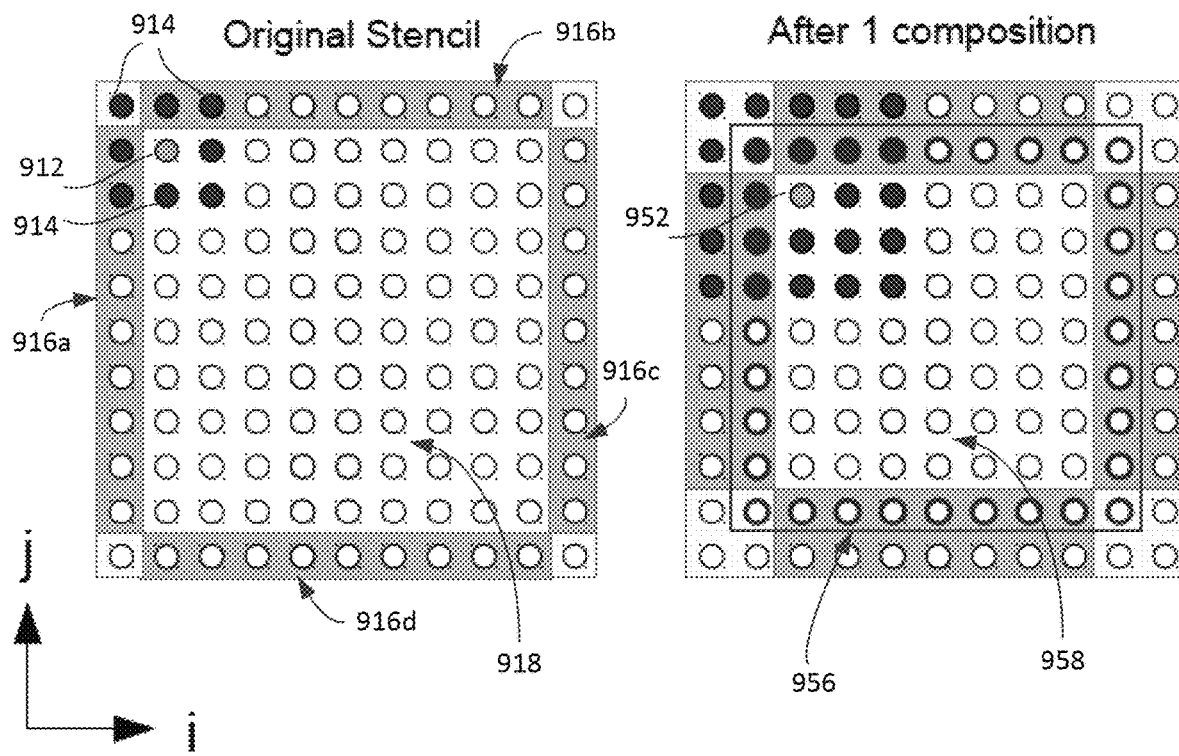
FIG. 9 schematically depicts a stencil and its boundary points, and an amplified stencil obtained after one composition according to one embodiment, and its boundary points.

To illustrate, consider $P^{(0)}$ as a 3×3, 9 point, 2-dimensional stencil as shown in FIG. 9. The original stencil shows one computed point as a dot 912, the other eight points of the stencil as dots 914, the initial boundary values 916a, 916b, 916c, 916d, and $A_s$ 918. We begin by observing that, in the negative and positive direction of each dimension d the steady state stencil $P^{(t)}$ produced by $f_s^{(t-1)}$ will increase in size by $$k_d^- = \left| \min_{\forall p \in p^{(t-1)}} (o_p[d]) \right|$$

(negative direction) or $$k_d^+ = \left| \max_{\forall p \in p^{(t-1)}} (o_p[d]) \right|$$

(positive direction). We refer to $k_d^-$ and $k_d^+$ as the orders of the stencil in dimension d in the negative and positive directions, respectively. In our example, at t=0 the order along each dimension is 1, i.e., ($k_0^-=k_0^+=k_1^+=1$).

If the steady state amplified stencil is applied at all points in $A_s^{(0)}$ then all $p \in P^{(1)}$ at a distance $k_d^r$ elements or less from the boundary in any dimension d and direction r will reference points outside of array A. In the foregoing example, the stencil grows to a 5×5, 25 point stencil after one amplification. The set of points 956 are all within $k_d^r$ points of the edges of $A_s^{(0)}$. If these points were expanded to the steady state stencil $P^{(1)}$ then they would reference points outside of the array A.

In various embodiments, we consider the set of points at a distance $k_d^r$ elements or less from the boundary of the array A in any dimension d and direction r to be a boundary set $B^{(1)}$ and determine a new steady state set in terms of that boundary set as:

$$B^{(1)} \subset A_s^{(0)} \quad (8)$$

$$A_s^{(1)} = A_s^{(0)} - B^{(1)} \quad (9)$$

In general, for a given order $k_d^r$, its dimension d, and direction r a stencil computed at a central point will access a point at a distance of 2k elements along the dimension and direction of k. Since it is assumed that all points accessed by the original stencil are contained in A and are at most k points away from the boundary, we determine the elements of $B^{(1)}$ by locating all points in $A^{(0)}$ within k points of the boundary for all orders k, dimensions d, and directions r.

In FIG. 9, $A_s^{(0)}$ and $A_s^{(1)}$ are indicated at 918, 958, respectively. The boundary points $B^{(1)}$ are indicated at 956. Representative stencil and substencil points $P^{(0)}$ and $P^{(1)}$ are indicated at 912, 952, respectively. In some embodiments, we partition the set $B^{(1)}$ such that each partition contains points having the same distance to one or more boundaries. Thus, in these embodiments each point in a partition expands to the same stencil shape. For boundary areas $B^{(t)}$ we generate specialized stencils to correctly compute $A^{(t)}$. To this end, we define the specialized stencil computed at boundary point $\vec{b} \in B^{(t)}$ at time t as $P_b^{(t)}$. In order to generate $P_b^{(t)}$ we begin with the original stencil P at each point in $B^{(t)}$. We amplify the stencil as described above, except that we do not amplify boundary values any further and only multiply them by their weight. This process is repeated for all $\vec{b} \in B^{(t)}$ to produce a corresponding $P\vec{b}^{(t)}$.

Figure 10:
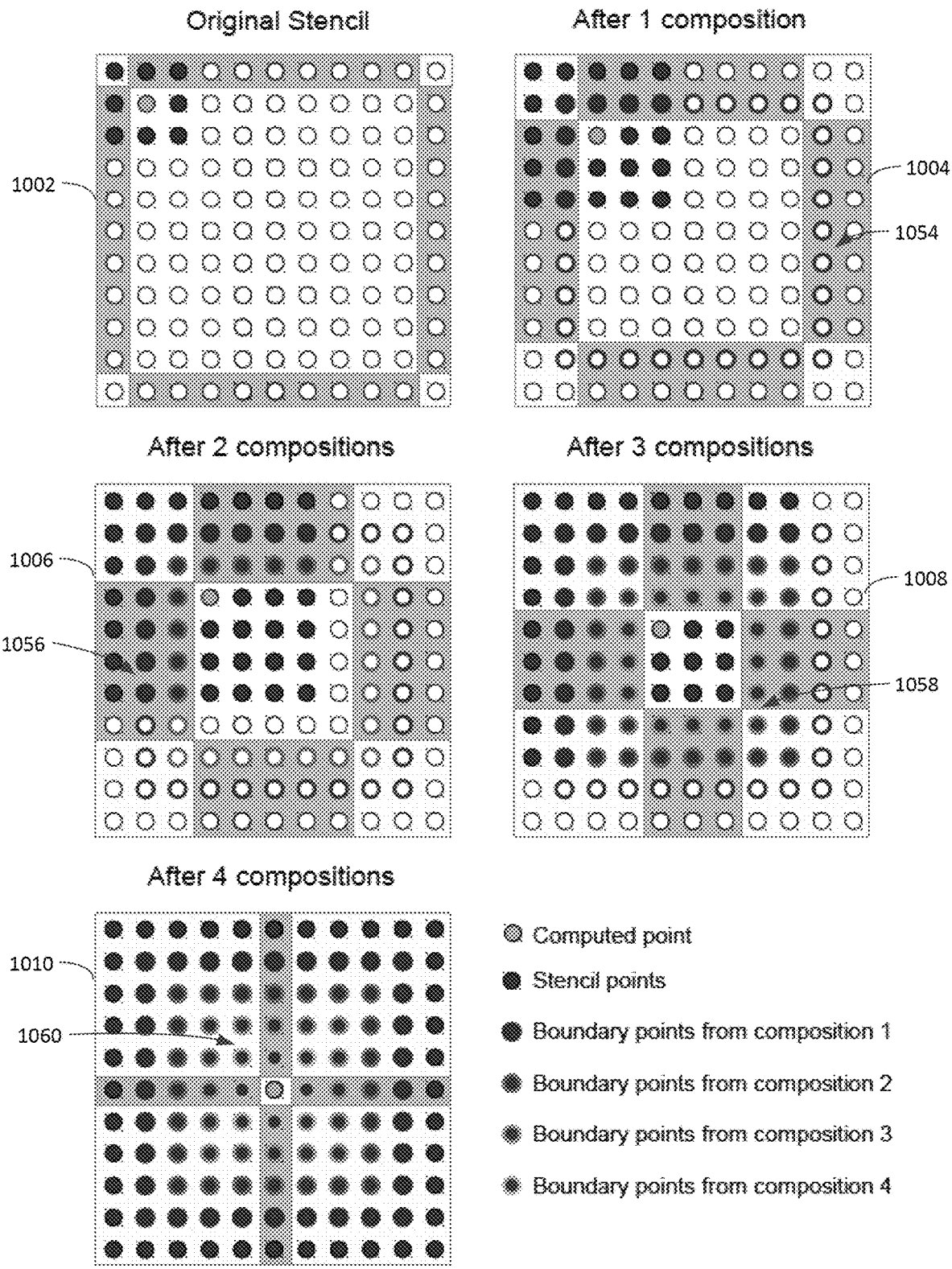
FIG. 10 schematically depicts a stencil and its boundary points, and amplified stencils obtained after several compositions according to different embodiments, and their respective boundary points.

With reference to FIG. 10, a 9 point, 2 dimensional original stencil 1002 is amplified using 1, 2, 3, and 4 compositions. The amplified stencil 1004, after one composition, has boundary points 1054. The amplified stencil 1006, after two compositions, has boundary points 1056. The amplified stencil 1008, after three compositions, has boundary points 1058. Finally, the amplified stencil 1010, after four compositions, has boundary points 1060.

In various embodiments, we begin amplification by specifying a multidimensional stencil $P^{(0)}$ that is computed on a specified subset $A^{(0)}$ of an array A for a specified number of major steps in a sequence of steps or iterations T. We use an amplification factor $t \leq T$ to control the size of the amplified stencil. We amplify $P^{(0)}$ t times to produce a steady state stencil $P^{(t)}$. We describe the points computed using $P^{(t)}$ as $A^{(t)}$ and a boundary area $B^{(t)}$. For each point in the boundary area, we generate a specialized stencil $P_b^{(t)}$. In some embodiments, we reduce the total number of iterations to T/t, and generate code to scan the set of points in $A_s^{(t)} \cup B^{(t)}$ and apply the appropriate stencil, either steady state or specialized, at each point.

Optimization of Boundary Code

Figure 15:
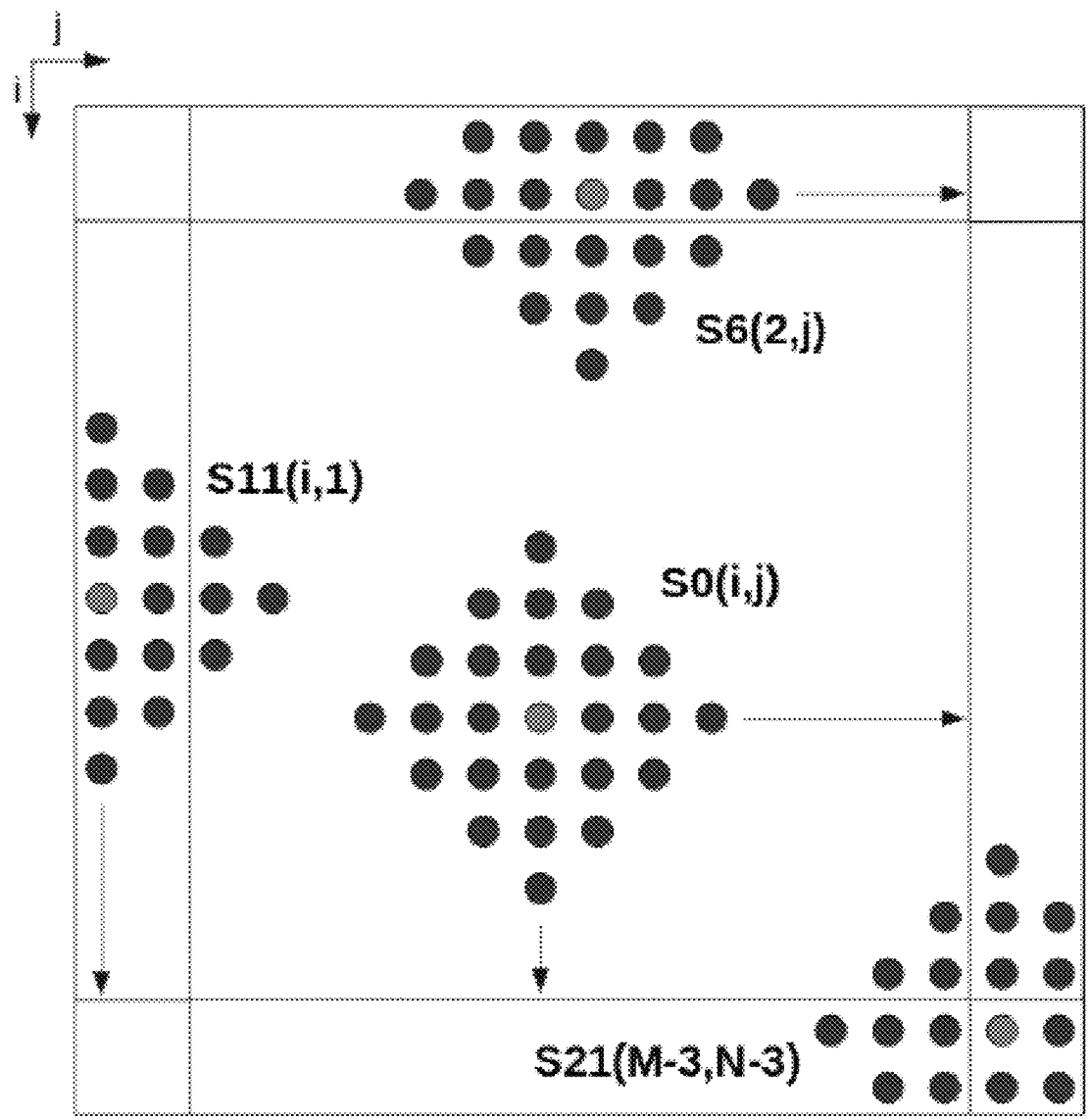
FIG. 15 schematically depicts an amplified stencil, generated according to one embodiment.

In discussing further optional improvements of boundary code generation we use a 5-point 2D twice amplified stencil as a running example. The initial unoptimized code is shown in FIG. 11 in Listing 6 and the code having a steady-state amplified stencil is shown in FIG. 12 in Listing 7. Stencils near the edge of the original domain (not shown in Listing 2) have a different shape than the steady-state stencil and have different coefficients, as well. We call these amplified boundary stencils (ABS). A pictorial representation of the ABS is shown below in FIG. 15. The performance of a boundary amplifier that can produce one or more ABS can be improved in various embodiments as described below.

In some embodiments, a boundary amplifier generates a reasonable number of ABS. A naive approach for generating ABS is to produce an amplified stencil (and a corresponding program statement) at every boundary point. One disadvantage of this approach is that a different ABS may be required for every boundary point. This can lead to large source and binary programs, i.e., in code having a size that is 10%, 20%, 30%, 50% larger, or even greater than the size of the original unoptimized code. Another disadvantage of the naive approach is that each point is amplified separately; this can lead to a longer compile time. This approach is illustrated in FIG. 13 in Listing 8. Actual stencil expressions have been replaced by numbered statements, for brevity. Here lines 6-7 and 26-27 represent the O(N) statements; similarly lines 14-15 and 18-19 represent O(M) statements.

Instead of the naïve approach, in some embodiments we generate a single program statement for ABS with identical shapes, and coefficients that vary linearly in one or more dimensions of the data structure associated with the stencil computations. We describe such dimensions as parametric dimensions. Dimensions that do not vary are described as absolute dimensions. ABS with all absolute dimensions correspond to a unique point of a stencil. ABS with one or more parametric dimensions correspond to several stencil points and can be enclosed by one or more loops in generated code.

During iterations of these loops, the respective coefficient(s) can be varied according to the respective loop indices, allowing reuse of a single statement representing the boundary amplification across the parametric dimensions in the code describing overall stencil amplification. In general, the code representing the amplified stencil may include more than one loop nests, each loop nest representing a different group of ABS. Such loops can be found on lines 6-8, 15-17, 20-22, and 29-31 in FIG. 14 in Listing 9. Wrapping statements in loop nests can reduce the number of statements in generated code from O(N+M) to O(1). Some of the ABS from Listings 8 and 9 are shown schematically in FIG. 15. Additionally, the steady state stencils are also shown.

Some embodiments determine the number of ABS, their iteration domains, and their shapes. In order to determine the number of required ABS, we first divide the domain into regions by considering all combinations of absolute and parametric dimensions. Additionally, for absolute dimensions we consider whether the region is on the lower or upper bound boundary. This is shown in Table 1 for an example of a 2D problem. Division of regions may be performed for stencils having one or more than two dimensions.

The ABS regions that are absolute in all dimensions correspond to corners. For these corner regions lower bound and upper bound combinations are used to uniquely identify a particular region. All ABS contained within these regions are unique and must be amplified separately. The ABS region in which all dimensions are parametric corresponds to the steady state. The ABS included in a region with at least one absolute and at least one parametric dimension can be placed within a loop nest as deep as the number of parametric dimensions, where each nested loop corresponds to a respective parametric dimension.

In some embodiments, one or more ABS regions are sized according to the difference between the order of the amplified steady-state stencil and the order of the original stencil.

As noted above, the order of a stencil can be described as the number of points from the center to the edge in each dimension. Note that this implies the existence of two orders per dimension of the stencil on every dimension, one in the direction of the lower bound and one in the direction of the upper bound. Thus the total number of sizes for all ABS regions is limited to 2*d where d is the number of dimensions in the stencil. In one or more dimensions, the two orders can be the same.

In some embodiments, the size $S^{d,r}$ of an ABS region along an absolute dimension din direction r is set as the difference in the order of the amplified steady-state stencil, denoted $O^{d,r}$, and the order of the original stencil, denoted $O^{d,r}$. Whether the boundary is along the lower bound or the upper bound of the stencil may be used to select the dimension and direction of the stencil along which the order difference is calculated. In some embodiments, the ABS region starts at the original lower/upper bound and continues towards the opposite bound for $S^{d,r}$ points in each absolute dimension.

In various embodiments, the size of each region is used to calculate loop bounds for each parametric dimension and fixed coordinates for each absolute dimension. In some embodiments, for absolute dimensions, we move back from the boundary $S^{d,r}$ steps along each absolute dimension and amplify the stencil at each step in order to create an ABS. Each one of these ABS is a statement in the final generated code. In some embodiments, in performing amplification along a parametric dimension, it is assumed that that dimension extends infinitely in each direction. Loop bounds derived from the region sizes are used in these embodiments to ensure that the ABS will not access points outside of the original domain, i.e., elements that do not exist in the original data structure are not accessed.

In order to correctly amplify a stencil at a boundary point, all points used to compute the ABS must correspond to the points that would have been used to compute the corresponding unamplified stencil, if it was calculated over a series of time/sequence steps. Therefore, in some embodiments, we alter the steady state amplification process to eliminate the expansion of points when this would result in an amplified point accessing a memory location outside of the original domain. As certain points are not expanded, the ABS takes an asymmetric form. For absolute dimensions whether an array access is outside of the original domain can be determined as described above. For parametric dimensions, in various embodiments the array access is assumed to be in bounds by selecting suitable loop bound as described above.

In some embodiments, the ABS are placed in the generated code such that execution overhead is minimized. To this end, in some embodiments the spatial and temporal locality is preserved when generating code representing the amplified stencils. In some embodiments, code is generated to perform row-major traversals of arrays using, for example, the fusion of parametric ABS loops with the steady-state loop nest, and rearrangement of other ABS statements. In some embodiments, this allows all spatially contiguous stencil write operations along the fastest varying dimension to occur sequentially in time as well as in space. Thus, in these embodiments, all stencil points in a row from left-to-right are computed. The process then moves down one row and repeats.

The advantage of this approach is threefold. First, continuous accesses allow data reads and writes to addresses in the same cacheline to occur more frequently. Second, ABS loops that traverse arrays in an inefficient manner (e.g., column-major access pattern for statements S11, S12, S13, and S14) are fused into the steady state loop such that the column major access pattern is eliminated, or may be significantly reduced in some embodiments. Finally, continuous accesses enable longer regular access patterns that can be exploited by hardware prefetch units. A pseudocode for an optimized version of the running example is shown in FIG. 16 in Listing 10.

Stencil Amplification Algorithms

With reference to FIG. 17, Algorithm 1 provides a high-level overview of some embodiments of a stencil amplifier. The algorithm begins by initializing the amplified stencil to the empty set at line 1. On line 2 the amplified steady state stencil is created using the amplifySteadyState( ) function, such as that described in Algorithm 2. Line 3 amplifies boundary stencils with a call to the amplifyBoundary( ) function such as that described in Algorithm 3. Finally, on line 4, the amplified steady state and amplified boundary stencils are combined to produce the final amplified stencil.

In various embodiments, Algorithm 2 shown in FIG. 18 is a recursive process that amplifies the original stencil S by a selected amplification factor G to produce a stencil suitable for execution across all points in the steady state. The algorithm begins by initializing the steady state stencil to the empty set, at line 1. At line 2 we begin a loop over each point in the stencil. Lines 3-4 calculate the weight of the stencil point and its offset from the center of the initial center of the stencil using procedures described above. The condition at line 5 guards the base and recursive cases. At the base case of G=0, recursion terminates and the weight of the current stencil point is multiplied by the value of A at the offset $o_s$ from a point i in the steady state of the stencil. The result may be stored in a temporary variable t. The recursive case is handled on line 8. Here, we multiply the weight of the current stencil point with the result of amplifying the current point by the amplification factor (G−1). Again the result may be stored in the temporary variable t. On line 10 t is added to the steady state stencil $S_{ss}$.

With reference to FIG. 19, Algorithm 3 is a process according to some embodiments that may be used to create all boundary stencils. This algorithm operates in two phases. In phase 1, from lines 1-11, the specific points that cannot be computed in the steady state are determined. In phase 2, from lines 12-15, each of these points is amplified individually with a call to the amplifyPoint( ) function described in Algorithm 4, as shown in FIG. 20.

Phase 1 of Algorithm 3 begins on lines 1-2 with initialization of both the set of boundary stencils B and the set of boundary points to be amplified N, to the empty set. Line 3 begins a loop over each point d in the original stencil domain. The loop from lines 4-10 examines each point of the steady state stencil centered at d. If the point would access a point outside of array A, the original point d is added to the set of boundary points to be amplified on line 7. Phase 2 loops through each of the boundary points identified in Phase 1 and amplifies at that specific point (e.g., A[1][1][1]).

With reference to FIG. 20, Algorithm 4 is a recursive procedure similar to Algorithm 2. On line 1, the boundary stencil is initialized to the empty set. Lines 2-15 contain a loop over each point s in the unamplified stencil S. Line 3 computes the weight of the point s, and line 4 calculates the absolute index of stencil point s with respect to the array A. Lines 5-6 are the base case of the recursion. If amplification is completed (e.g., G=0), or if the current point is not in the original domain ($i_s \notin D$) we create a term t where the array value $A[i_s]$ is multiplied by the weight $w_s$. Lines 7-8 perform recursive amplification of the boundary points. Here $i_s \in D$, so we can amplify another step and scale the result by $w_s$.

The techniques and algorithms described above, in general, can avoid one or more major steps in a sequence of computations or one or more iterations in an iterative procedure. In addition, the total number of computations and/or communication operations required to complete a specified task can be minimized, as well. In various embodiments, stencil amplification can be selected and/or controlled such that one or more performance parameters of a processor are adjusted and/or optimized.

In particular, in some embodiments, memory consumption and/or processing time at both compile time and run time may be optimized. For example, algebraic optimizations may be applied to the stencils produced using the procedures described above to combine add operations into multiplication operations, and to transform several multiplication operations into exponentiation operations. In some embodiments, loop invariant code motion may be performed to hoist at least some of the computations of stencil coefficients or components thereof to outer loop levels and/or outside the outermost loop. If one or more original coefficient values are known at compile time, one or more resulting coefficient values may be computed at compile time as opposed to computing them at runtime.

Stencil amplification can increase the code size. As such, in some embodiments, the original code is modified by amplifying one or more stencils such that the size of the modified code is optimized and/or maintained at or below a specified size threshold. Boundary stencils may be combined into groups where the same points of the steady-state stencil may fall outside of the array. Statements for these stencils can be replaced by a single statement and wrapped in one or more loop nests in order to traverse all points, as described above with reference to FIGS. 11-16, so as to improve the performance of a computing system performing the stencil computation.

Stencil amplification is discussed above using Listing 1 (FIG. 2) as an example. As described above, Listing 1 includes an outer sequential loop t, and a spatial loop i, in which the elements of the array A are accessed. In general, stencil amplification according to various embodiments described herein can be applied to a sequence of major steps of a computation, such as that depicted in FIG. 21A. The values computed at the major step S1( ) may be used in the computations at the major step S2( ). The values computed at the major step S2( ) may then be used in the computations at the major step S3( ), and so on. Stencil amplification, as described above, can be used to any block of two or more of these major steps of computations in the sequence S1( ); S2( ); . . . ; Sk( ).

Stencil amplification may also be applied to one or more loop nests specified within a sequential loop. For example, FIG. 21B shows a code fragment having sequential loop p, that includes a loop nest (i, j, k). Each loop in the loop nest has a different bound, but one or more loops in a loop nest can have the same bounds. The loop nest (i, j, k) includes three statements S0, S1, S2, each accessing a different number of data structures. Different statements may access the same number of data structures and/or may access the same data structures as another statement. A loop nest, in general, may include any number of statements. Stencil amplification according to various embodiments can be applied to one or more of these statements. The sequential loop p also include a second loop j, having different bounds than the loop j included in the loop nest (i, j, k). in general, different loops in one outer sequential loop may use the same loop variable or different loop variables, and/or may have the same bounds or different bounds. Stencil amplification according to various embodiments may be applied to the statement S3 in the second loop j, as well.

The code fragment shown in FIG. 21B also includes another sequential loop t including a loop nest (j, k), that includes a statement S4. Stencil amplification according to various embodiments may be applied to the statement S4. In general, a specified code may include several sequential loops including stencils that can be amplified using various embodiments. Such sequential loops may use the same loop variable or different loop variables, and/or may have the same bounds or different bounds.

In some embodiments, either boundary or steady state values are left scalar, i.e., the stencils using these values are not amplified. For example, in some embodiments the boundary points are not amplified and, instead, are calculated in a naive manner. In other embodiments, the boundary and steady-state amplification factors can be different. In some embodiments, the weights of stencil are time-varying. One or more array values may also vary independently or the previous major step or iteration. For example an electromagnetic simulation may include an antenna broadcasting a periodic signal leading to boundary values that are not computed by a stencil but, instead, are a function of time.

With reference to FIGS. 22A-22C, in some cases, the weights of stencil or array values are received from another array. In the code fragment shown in FIG. 22A, the weights are received from different elements of the array w. In some image processing applications each array point may be weighted by its value in the original image or in some video-processing applications each array point may be weighted by its value in a previous frame. Thus, one or more weights in a current step/iteration can be array values from a previous step/iteration. This illustrated by the example code fragments in FIGS. 22B and 22C. The stencil amplification can therefore be applied to two arrays. Thus, in the code fragments shown in FIGS. 22A-22C, an amplification of a stencil may include the expansion of the array B as described above. If the weights depend on a previous computation, i.e., if the weights can change from one major step/iteration to another in a major step/iteration-dependent manner, such weight arrays may also be expanded using the techniques described above.

In some embodiments, the weights of a stencil or array values are the result of a previous stencil computation, which may include an amplified stencil. For instance, in a convolutional neural network a sequence of single sweep stencil computations are often performed. In some embodiments, one or more of these sweeps are amplified by composing the stencils from predecessor sweeps. For example, if the overall computation includes a sequence of N stencil computation steps, a stencil can be amplified to transform any block of M consecutive steps into a single step, where M≤N.

In some embodiments, a stencil that is to be amplified may include one or more points that are associated with more than one array references. Alternatively, or in addition, more than one weight may be associated with one or more stencil points. For example, a computation associated with one or more stencil points may include two weights and two array references: w*x*A[i]*B[i]. Two weights and two arrays are illustrative only. In general, the number of weights and the number of array references associated with a stencil point need not be the same. Each of these numbers can take on any value such as 1, 2, 3, 5, 6, 8, etc. The amplification procedure described above can expand one or more arrays referenced at each point and can apply algebraic transforms in generating the resulting coefficients based on the one or more weights associated with each stencil point.

In various embodiments, the operations associated with a stencil point and/or a stencil may include but are not limited to addition, subtraction, multiplication, division, modulo, minimum, maximum, shift, exponentiation, logarithm, transcendental functions, union, intersection, and negation. For example, max pooling layers of a convolutional neural network may use the maximum operator in place of the sum operator used in the examples discussed above.

In some embodiments, the domain size varies across stencils during the amplification process. For example, a max pooling layer of a convolutional neural network can compute the maximum values of non-overlapping four-point, two-dimensional stencils and place them in a new array, thus reducing the size of the original domain by four. This can be followed by a sum-of-products five-point stencil. Each point of the five-point stencil in the reduced domain can be amplified by the four-point stencil used to compute it in the original domain.

In some embodiments, the steady-state points and/or boundary points may be subdivided into several subregions, and a different amplification factor may be used in each subregion. For example, in a stencil computation simulating and analyzing a physical system that includes trees, buildings, cars, etc., different portions of the array may correspond to different objects (e.g., a tree, a building, etc.). Different stencils corresponding to such different portions of the array may be amplified using different amplification factors.

An embodiment of a stencil amplifier can be a standalone software system or a component integrated into another software system including but not limited to a domain-specific language compiler, a general purpose compiler, a software system implementing a stencil computation, or a general purpose programming environment.

The generalized distributive law and factor graphs are a general sum-of-products formulation applicable to a number of problems in signal processing and coding theory. In general, factor graphs are not solved via iterative calculations; however, in the special case that a factor graph contains a cycle, an iterative solution may be computed and optimized according to various embodiments described herein.

Convolutional neural networks generally use a sequence of convolutions and non-linear functions to perform classification and localization of objects in images. Various embodiments described herein can be applied to combined sequential convolutions and non-linear function applications to produce an optimized convolutional neural network.

As discussed herein, stencil amplification that can account for one or more of the parameters of a computing system, such as memory bandwidth, cache size, available run time, available compile time, code size, etc., cannot be considered to be a mathematical concept. Such amplification takes into consideration one or more of: the size and shape of one or more data structures involved in a stencil computation, the number of data elements accessed in a single unamplified stencil computation, the data-access patterns during computations, including distribution or contiguity of the data elements across one or more data structure, and the dependency of the values used in a current iteration or step in a sequence of steps on the values computed in a previous iteration or step. Stencil amplification can thus increase efficiency of certain computations, as described above. It is not merely performing generic computer and/or database operations and is also not mere data organization or reorganization.

Unlike any generic operations such as data transmission and reception, unlike usual computer functions such as storage and access of information, and unlike any mathematical or mental processes such as comparing and categorizing information, the unconventional operations involved in stencil amplification, as described herein, are specifically orchestrated. Specifically, stencil amplification described in various embodiments generally involves analysis of data structure shapes and sizes, and increasing the number of data structure elements accessed in a single major step/iteration such that the total number of computations and/or communication operations are minimized, optionally under constraints such as limits on compile time, run time, code size, etc. In various embodiments, stencil amplification can ensure that while increasing the number of data structure elements accessed in a single major step/iteration, the elements not present in the data structure(s) are not accessed erroneously. These specific operations make the methods and systems for performing optimized stencil amplification limited and specialized techniques of improving the performance of a computing system. These techniques also allow for exploring various known optimizations that are not applicable to or are at least not effective if applied to an unamplified stencil.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for improving processing efficiency, the method comprising performing by a processor the steps of:
   in a specified computation defining iterations of execution of a stencil, wherein:
      the stencil comprises a set of stencil points, each stencil point corresponding to a respective element of a data structure; and
      in any iteration, an execution of the stencil comprises accessing only the elements of the data structure corresponding to the set of stencil points and not accessing other elements of the data structure,
   modifying the specified computation by amplifying the stencil according to a specified amplification factor (T), by recursively replacing a stencil point with a substencil comprising a set of substencil points corresponding to prior iterations from immediately prior iteration up to the (T+1)-th prior iteration, wherein:
      each substencil point corresponds to a respective element of the data structure; and
      at least one substencil point corresponds to an element of the data structure that is different from all elements of the data structure that correspond to the set of stencil points,
   wherein execution of the modified computation comprises:
      accessing from the memory, in an iteration of execution of the amplified stencil, the element of the data structure that corresponds to the at least one substencil point;
      computing a function of values of respective elements of the data structure corresponding to the set of substencil points; and
      reducing a number of iterations of the specified computation by the factor (T+1).

2. The method of claim 1, wherein modifying the computation comprises generating a loop nest corresponding to at least one stencil point, the loop nest comprising a loop corresponding to a parameterized dimension of the data structure, the loop comprising a statement accessing an element of the data structure in the parameterized dimension according to a parameter based at least in part on the loop index.

3. The method of claim 2, wherein the loop nest corresponds to at least one absolute dimension of the data structure.

4. The method of claim 1, wherein modifying the computation comprises generating a statement corresponding to a stencil point at which all dimensions of the data structure are absolute.

5. The method of claim 1, wherein:
   elements of the data structure corresponding to the stencil are represented using a central vector associated with the stencil and a respective offset vector associated with a corresponding stencil point, a cardinality of the central vector and a cardinality of the offset vector being equal to a number of spatial dimensions of the data structure, and each spatial dimension of the data structure corresponding to a respective element of the central vector and a respective element of the offset vector;

the substencil comprises first-level substencil points corresponding to the immediately prior iteration; and computing the function of values of respective elements of the data structure comprises:

for each first-level substencil point, computing a first-level resulting offset vector as a combination of the offset vector associated with the stencil point and an offset vector corresponding to that first-level substencil point; and specifying elements of the data structure associated with each first-level substencil point using the central vector associated with the stencil and a combination of an offset vector associated with the replaced stencil point and a first-level offset vector associated with a corresponding first-level substencil point.

6. The method of claim 5, further comprising:
for each spatial dimension associated with the resulting offset vectors corresponding to the first-level substencil points:
determining a first-level maximum offset value; and
from a boundary of the data structure in that spatial dimension, designating any data-structure element within a distance less than the first-level maximum offset value as a boundary element;
designating a stencil point from the set of stencil points as a boundary point if that stencil point corresponds to a boundary element; and
selecting a stencil point from the stencil, for replacement thereof with the first-level substencil points, only if that stencil point is not designated as a boundary point.

7. The method of claim 5, further comprising:
remodifying the computation by replacing a first-level substencil point with a second-level substencil comprising a set of second-level substencil points, each second-level substencil point corresponding to an iteration prior to the immediately prior iteration, and to a respective element of the data structure, at least one second-level substencil point corresponding to an element of the data structure that is different from all elements of the data structure that correspond to the set of stencil points and all first-level substencil points.

8. The method of claim 7, wherein modifying the computation further comprises:
for each second-level substencil point of the second-level substencil, computing a second-level resulting offset vector as a combination of the first-level resulting offset vector associated with a first-level substencil point to be replaced with the second-level substencil and an offset vector corresponding to that second-level substencil point; and
representing the first-level substencil point as a function of values of respective elements of the data structure corresponding to the set of second-level substencil points, each element of the data structure being specified using a central vector associated with the stencil and a second-level resulting offset vector associated with a corresponding second-level substencil point.

9. The method of claim 8, further comprising:
for each spatial dimension associated with the resulting offset vectors corresponding to the second-level substencil:
determining a second-level maximum offset value; and
from a boundary of the data structure in that spatial dimension, designating any data-structure element within a distance less than the second-level maximum offset value as a boundary element;
designating a stencil point from the set of stencil points as a boundary point if that stencil point corresponds to a boundary element; and
selecting a stencil point from the stencil, for replacement thereof with the second-level substencil, only if that stencil point is not designated as a boundary point.

10. The method of claim 7, wherein at least one of: (i) a cardinality of the set of first-level substencil points, and (ii) a cardinality of the set of second-level substencil points is greater than one.

11. The method of claim 1, wherein:
each stencil point in a subset of stencil points from the set of stencil points is associated with a respective stencil coefficient;
the substencil comprises a set of first-level substencil points corresponding to the immediately prior iteration;
each first-level substencil point in a subset of first-level substencil points from the set of first-level stencil points is associated with a respective first-level substencil coefficient; and
modifying the computation comprises generating a coefficient computation that produces a resulting coefficient, based on a stencil coefficient and a first-level substencil coefficient.

12. The method of claim 11, wherein:
the computation comprises a first stencil point and a second stencil point;
modifying the computation comprises:
replacing the first stencil point, having associated therewith a first stencil coefficient, with a first first-level substencil comprising a first first-level substencil point, having associated therewith a first substencil coefficient, and corresponding to a particular element of the data structure; and
replacing the second stencil point, having associated therewith a second stencil coefficient, with a second first-level substencil comprising a second first-level substencil point, having associated therewith a second substencil coefficient, and corresponding to the particular element of the data structure; and
generating the coefficient computation comprises specifying a transform operation that produces the resulting coefficient, the transform operation comprising the first and second stencil coefficients and the first and second substencil coefficients.

13. The method of claim 11, further comprising computing at compile time a value of the resulting coefficient.

14. The method of claim 11, wherein the computation is specified using a sequential iterator and each sequence step corresponds to a respective iteration of the sequential iterator, the method further comprising hoisting the coefficient computation from the sequential iterations, thereby decreasing a number of computations within an iteration corresponding to the sequential iterator.

15. The method of claim 1, wherein the computation is specified using a sequential iterator and each sequence step corresponds to a respective iteration of the sequential iterator, the method further comprising decreasing a number of iterations of the sequential iterator according to an amplification factor.

16. The method of claim 1, wherein:
each stencil point in a subset of stencil points from the set of stencil points is associated with a respective stencil coefficient;
the substencil comprises a set of first-level substencil points corresponding to the immediately prior iteration; and
the respective stencil coefficient comprises a value corresponding to an element of the data structure corresponding to a respective first-level substencil point from the set of first-level substencil points.

17. The method of claim 1, wherein the data structure comprises a plurality of arrays.

18. The method of claim 17, wherein:
the plurality of arrays comprises a first array comprising at least one iteration-dependent value and a second array;
each stencil point in the set of stencil points corresponds to a value of a respective element of the first array in a current iteration and to a value of a respective element of the second array; and
each first-level substencil point in the set of substencil points corresponds to a value of a respective element of the first array from a previous iteration.

19. The method of claim 18, wherein:
the second array comprises at least one iteration-dependent value; and
each first-level substencil point in the set of substencil points further corresponds to a value of a respective element of the second array from a previous iteration.

20. A system for amplifying a stencil, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
in a specified computation defining iterations of execution of a stencil, wherein:
the stencil comprises a set of stencil points, each stencil point corresponding to a value of a respective element of a data structure; and
in any iteration, an execution of the stencil comprises accessing only the elements of the data structure corresponding to the set of stencil points and not accessing other elements of the data structure,
modify the specified computation by amplifying the stencil according to a specified amplification factor (T), by recursively replacing a stencil point with a substencil comprising a set of substencil points corresponding to prior iterations from immediately prior iteration up to the (T+1)-th prior iteration, wherein:
each substencil point corresponds to a respective element of the data structure; and
at least one substencil point corresponds to an element of the data structure that is different from all elements of the data structure that correspond to the set of stencil points,
wherein execution of the modified computation comprises:
accessing from the memory, in an iteration of execution of the amplified stencil, the element of the data structure that corresponds to the at least one substencil point;
computing a function of values of respective elements of the data structure corresponding to the set of substencil points; and
reducing a number of iterations of the specified computation by a factor (T+1).

21. The system of claim 20, wherein to modify the computation, the instruction program the processing unit to generate a loop nest corresponding to at least one stencil point, the loop nest comprising a loop corresponding to a parameterized dimension of the data structure, the loop comprising a statement accessing an element of the data structure in the parameterized dimension according to a parameter based at least in part on the loop index.

22. The system of claim 21, wherein the loop nest corresponds to at least one absolute dimension of the data structure.

23. The system of claim 20, wherein to modify the computation, the instructions further program the processing unit to generate a statement corresponding to a stencil point at which all dimensions of the data structure are absolute.

24. The system of claim 20, wherein:
elements of the data structure corresponding to the stencil are represented
using a central vector associated with the stencil and a respective offset vector associated with a corresponding stencil point, a cardinality of the central vector and a cardinality of the offset vector being equal to a number of spatial dimensions of the data structure, and each spatial dimension of the data structure corresponding to a respective element of the central vector and a respective element of the offset vector;
the substencil comprises first-level substencil points corresponding to the immediately prior iteration; and
to compute the function of values of respective elements of the data structure, the instructions program the processing unit to:
for each first-level substencil point of the first-level substencil, compute a first-level resulting offset vector as a combination of the offset vector associated with the stencil point and an offset vector corresponding to that first-level substencil point; and
specify elements of the data structure associated with each first-level substencil point using the central vector associated with the stencil and a combination of an offset vector associated with the replaced stencil point and a first-level offset vector associated with a corresponding first-level substencil point.

25. The system of claim 24, wherein the instructions further program the processing unit to:
for each spatial dimension associated with the resulting offset vectors corresponding to the first-level substencil points:
determine a first-level maximum offset value; and
from a boundary of the data structure in that spatial dimension, designate any data-structure element within a distance less than the first-level maximum offset value as a boundary element;
designate a stencil point from the set of stencil points as a boundary point if that stencil point corresponds to a boundary element; and
select a stencil point from the stencil, for replacement thereof with the first-level substencil points, only if that stencil point is not designated as a boundary point.

26. The system of claim 24, wherein the instructions further program the processing unit to:
    remodify the computation by replacing a first-level substencil point with a second-level substencil comprising a set of second-level substencil points, each second-level substencil point corresponding to an iteration prior to the immediately prior iteration, and to a respective element of the data structure, at least one second-level substencil point corresponding to an element of the data structure that is different from all elements of the data structure that correspond to the set of stencil points and all first-level substencil points.

27. The system of claim 26, wherein to modify the computation, the instructions further program the processing unit to:
    compute, for each second-level substencil point of the second-level substencil, a second-level resulting offset vector as a combination of the first-level resulting offset vector associated with a first-level substencil point to be replaced with the second-level substencil and an offset vector corresponding to that second-level substencil point; and
    represent the first-level substencil point as a function of values of respective elements of the data structure corresponding to the set of second-level substencil points, each element of the data structure being specified using a central vector associated with the stencil and a second-level resulting offset vector associated with a corresponding second-level substencil point.

28. The system of claim 27, wherein the instructions further program the processing unit to:
    for each spatial dimension associated with the resulting offset vectors corresponding to the second-level substencil:
        determine a second-level maximum offset value; and
        from a boundary of the data structure in that spatial dimension, designate any data-structure element within a distance less than the second-level maximum offset value as a boundary element;
    designate a stencil point from the set of stencil points as a boundary point if that stencil point corresponds to a boundary element; and
    select a stencil point from the stencil, for replacement thereof with the second-level substencil, only if that stencil point is not designated as a boundary point.

29. The system of claim 26, wherein at least one of: (i) a cardinality of the set of first-level substencil points, and (ii) a cardinality of the set of second-level substencil points is greater than one.

30. The system of claim 20, wherein:
    each stencil point in a subset of stencil points from the set of stencil points is associated with a respective stencil coefficient;
    the substencil comprises a set of first-level substencil points corresponding to the immediately prior iteration;
    each first-level substencil point in a subset of first-level substencil points from the set of first-level stencil points is associated with a respective first-level substencil coefficient; and
    to modify the computation, the instructions further program the processing unit to generate a coefficient computation that produces a resulting coefficient, based on a stencil coefficient and a first-level substencil coefficient.

31. The system of claim 30, wherein:
    the computation comprises a first stencil point and a second stencil point;
    to modify the computation, the instructions further program the processing unit to:
        replace the first stencil point, having associated therewith a first stencil coefficient, with a first first-level substencil comprising a first first-level substencil point, having associated therewith a first substencil coefficient, and corresponding to a particular element of the data structure; and
        replace the second stencil point, having associated therewith a second stencil coefficient, with a second first-level substencil comprising a second first-level substencil point, having associated therewith a second substencil coefficient, and corresponding to the particular element of the data structure; and
    to generate the coefficient computation, the instructions further program the processing unit to specify a transform operation that produces the resulting coefficient, the transform operation comprising the first and second stencil coefficients and the first and second substencil coefficients.

32. The system of claim 30, wherein the instructions further program the processing unit to compute at compile time a value of the resulting coefficient.

33. The system of claim 30, wherein:
    the computation is specified using a sequential iterator and each sequence step corresponds to a respective iteration of the sequential iterator; and
    the instructions further program the processing unit to hoist the coefficient computation from the sequential iterations, thereby decreasing a number of computations within an iteration corresponding to the sequential iterator.

34. The system of claim 20, wherein:
    the computation is specified using a sequential iterator and each sequence step corresponds to a respective iteration of the sequential iterator; and
    the instructions further program the processing unit to decrease a number of iterations of the sequential iterator according to an amplification factor.

35. The system of claim 20, wherein:
    each stencil point in a subset of stencil points from the set of stencil points is associated with a respective stencil coefficient;
    the substencil comprises a set of first-level substencil points correspondinq to the immediately prior iteration; and
    the respective stencil coefficient comprises a value corresponding to an element of the data structure corresponding to a respective first-level substencil point from the set of first-level substencil points.

36. The system of claim 20, wherein the data structure comprises a plurality of arrays.

37. The system of claim 36, wherein:
    the plurality of arrays comprises a first array comprising at least one iteration-dependent value and a second array;
    each stencil point in the set of stencil points corresponds to a value of a respective element of the first array in a current iteration and to a value of a respective element of the second array; and
    each first-level substencil point in the set of substencil points corresponds to a value of a respective element of the first array from a previous iteration.

38. The system of claim 37, wherein:
    the second array comprises at least one iteration-dependent value; and each first-level substencil point in the set of substencil points further corresponds to a value of a respective element of the second array from a previous iteration.

\* \* \* \* \*